United States Patent
Bickham et al.

(10) Patent No.: US 8,977,092 B2
(45) Date of Patent: Mar. 10, 2015

(54) MULTIMODE OPTICAL FIBER AND SYSTEM COMPRISING SUCH FIBER

(75) Inventors: Scott Robertson Bickham, Corning, NY (US); Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 357 days.

(21) Appl. No.: 13/553,899

(22) Filed: Jul. 20, 2012

(65) Prior Publication Data

US 2013/0322837 A1    Dec. 5, 2013

Related U.S. Application Data

(63) Continuation-in-part of application No. 13/484,970, filed on May 31, 2012, now Pat. No. 8,837,890.

(51) Int. Cl.
*G02B 6/028* (2006.01)
*G02B 6/036* (2006.01)
*G02B 6/02* (2006.01)

(52) U.S. Cl.
CPC ............ *G02B 6/0288* (2013.01); *G02B 6/0365* (2013.01); *G02B 6/02023* (2013.01); *G02B 6/0281* (2013.01)
USPC ....................................................... 385/124

(58) Field of Classification Search
None
See application file for complete search history.

(56) References Cited

U.S. PATENT DOCUMENTS

| | | | |
|---|---|---|---|
| 7,787,731 B2 | 8/2010 | Bookbinder et al. | |
| 7,903,918 B1 * | 3/2011 | Bickham et al. | 385/124 |
| 2009/0169163 A1 | 7/2009 | Abbott, III et al. | |
| 2010/0303428 A1 | 12/2010 | Bickham et al. | |

OTHER PUBLICATIONS

Donlagic, D., "Opportunities to Enhance Multimode Fiber Links by Application of Overfilled Launch", J. Lightwave Tech., vol. 23, No. 11, pp. 3526-3540 (Nov. 2005).
Lenahan, T.A., "Calculation of Modes in an Optical Fiber Using the Finite Element Method and EISPACK", Bell Sys. Tech. J., vol. 62, pp. 2663-2695 (1983).
Fang, A.W. et al., "Electrically pumped hybrid AlGaInAs-silicon evanescentlaser", Optics Express, vol. 14, pp. 9203-9210 (Oct. 2006).

\* cited by examiner

*Primary Examiner* — Mike Stahl
(74) *Attorney, Agent, or Firm* — Svetlana Short

(57) ABSTRACT

One exemplary multimode optical fiber includes a graded index glass core having a diameter in the range of 41 microns to 80 microns, a graded index having an alpha less than 2.04 and a maximum relative refractive index in the range between 0.6% and 1.8%. The cladding includes a depressed-index annular portion. The fiber has an overfilled bandwidth greater than 2.5 GHz-km at at least one wavelength between 1200 nm and 1700 nm.

23 Claims, 4 Drawing Sheets

MULTIMODE OPTICAL FIBER AND SYSTEM COMPRISING SUCH FIBER

CROSS-REFERENCE TO RELATED APPLICATION

This application is a Continuation-in-Part and claims the benefit of priority to U.S. Priority patent application Ser. No. 13/484,970, filed on May 31, 2012 now U.S. Pat. No. 8,837,890, the content of which is relied upon and incorporated herein by reference in its entirety and the benefit of priority under 35 U.S.C. Section 120 is hereby claimed.

BACKGROUND

The present invention generally relates to fiber optic communication, and more particularly relates to a multimode optical fiber that may be particularly useful for use for wavelength division multiplexing in the 1310 nm and/or the 1550 nm window.

High performance computing and data center installations typically require a large number of processor-to-processor interconnections, and using multimode (MM) optical fibers in these systems is cost-effective due to more relaxed alignment tolerances due to the large core diameter. These systems typically operate in the 850 nm wavelength window, utilizing relatively inexpensive VCSEL laser sources. Optical fiber has relatively high dispersion at 850 nm, and this leads to rapid broadening of the optical signals. This high dispersion is a key limitation for the maximum system length, particularly at data modulation rates of 25 GHz and higher. In addition, the fiber attenuation is relatively high at 850 nm, and this negatively impacts the performance when the system length is more than a few tens of meters.

SUMMARY

According to some embodiments, a multimode optical fiber is provided. The fiber includes a graded index glass core having a diameter in the range 41 microns to 80 microns, a graded index having an alpha profile wherein $1.95 \leq \alpha \leq 2.04$ and a maximum relative refractive index in the range between 0.6% and 1.8%, for example 0.6% to 1.6%. The fiber also includes a cladding surrounding in contact with the core. The cladding includes a depressed-index annular portion. The fiber further has an overfilled bandwidth greater than 2500 MHz-km at least one wavelength between 1200 nm and 1700 nm (for example between 1260 nm and 1610 nm).

Preferably, core has a numerical aperture NA, where $0.16<NA<0.26$. According to some embodiments the cladding includes an inner annular portion with relative refractive index delta $\Delta_2$, measured at the radial location where the first derivative $d(\Delta/\Delta_{1MAX})/d(r/R_1)$, is equal to −2.5.

According to some embodiments the cladding comprises an inner annular portion surrounding and in contact with the core, the depressed-index annular portion surrounding the inner annular portion, and an outer annular portion surrounding and in contact with the depressed-index annular portion.

High performance computing and data center installations typically require a large number of processor-to-processor interconnections, and using multimode optical fibers discussed herein in these systems results in lower connector costs due to less stringent alignment tolerances compared to systems that utilize single mode (SM) fibers. In addition, systems operating in the 1310 nm and/or 1550 nm windows offer a significant performance advantage over conventional systems operating at 850 nm due to lower fiber dispersion and attenuation. This is particularly important at data modulation rates of 25 GHz and higher, where dispersive broadening of the optical signals results in large impairments. In addition, high data rate systems employing silicon-photonic transceivers in the 1310 nm and/or 1550 nm windows advantageously require much less electrical power than conventional VCSEL-based systems operating at 850 nm. The optical fibers and systems described herein can advantageously be used with both VCSEL and silicon-photonic laser sources in the 1310 nm or 1550 nm windows.

There is a need for multimode optical fibers that are capable of transmitting at least one signal modulated at 25 GHz or higher in the 1310 nm window, over distances of at least 100 m. The fiber embodiments described herein are capable of transmitting at least four signals modulated at 25 GHz or higher in the 1310 nm window, over distances of at least 100 m. Some fiber embodiments described herein are also capable of transmitting at least four signals modulated at 25 GHz or higher in the 1310 nm window, over distances of at least 300 m. Some fiber embodiments described herein are also capable of transmitting at least four signals modulated at 25 GHz or higher in the 1310 nm window, over distances of at least 500 m.

Similarly, there is a need for multimode optical fibers that are capable of transmitting at least one signal modulated at 25 GHz or higher in the 1550 nm window, over distances of at least 100 m. The fiber embodiments described herein are capable of transmitting at least four signals modulated at 25 GHz or higher in the 1550 nm window, over distances of at least 100 m. Some fiber embodiments described herein are also capable of transmitting at least four signals modulated at 25 GHz or higher in the 1550 nm window, over distances of at least 300 m. Some fiber embodiments described herein are also capable of transmitting at least four signals modulated at 25 GHz or higher in the 1550 nm window, over distances of at least 500 m.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
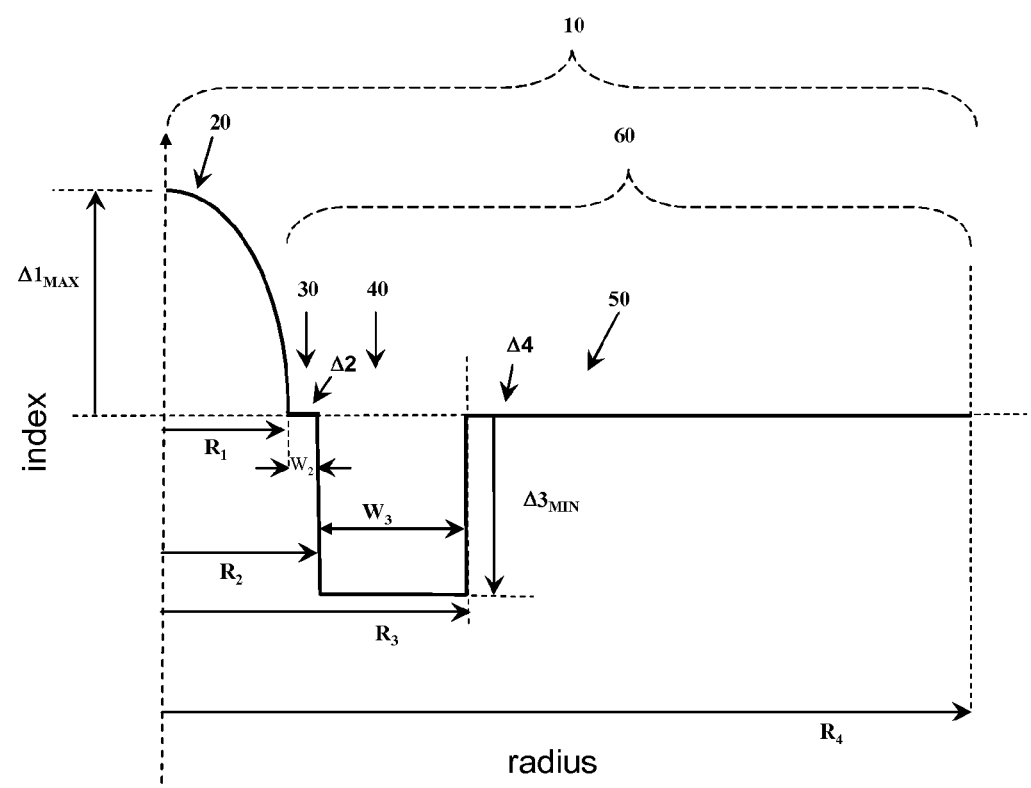
FIG. 1 is a schematic diagram (not to scale) of the refractive index profile of a cross section of the glass portion of an exemplary embodiment of a multimode optical fiber having a depressed-index annular portion, according to one embodiment.

Reference will now be made in detail to the present preferred embodiments, examples of which are illustrated in the accompanying drawings. Whenever possible, the same reference numerals will be used throughout the drawings to refer to the same or like parts.

The "refractive index profile" is the relationship between refractive index or relative refractive index and waveguide fiber radius.

The "relative refractive index" is defined as $\Delta = 100 \times [n(r)^2 - n_{cl}^2]/2n(r)^2$, where $n(r)$ is the refractive index at the radial distance r from the fiber's centerline, and $n_{cl}$ is the average refractive index of the outer cladding at a wavelength of 1310 nm. Unless otherwise specified, when the fiber diameter is 125 microns, $n_{cl}$ is determined by averaging the refractive index over a radius range between about 45 and 55 microns, e.g.

$$n_{cl} = \sum_{i=1}^{N} n_i(r)/N$$

where there are N data points in the range 45≤r≤55 microns, and N at least 2. In embodiments where the fiber diameter, $2*R_4$, is not equal to 125 microns, $n_{cl}$ is determined by averaging the refractive index over a radius range between about $0.72*R_4$ and $0.88*R_4$. In one aspect, the cladding comprises essentially pure silica. In other aspects, the cladding may comprise silica with one or more dopants (e.g., $GeO_2$, $Al_2O_3$, $P_2O_5$, $TiO_2$, $ZrO_2$, $Nb_2O_5$ and/or $Ta_2O_5$) which increase the index of refraction, in which case the cladding is "up-doped" with respect to pure silica. The cladding may also comprise silica with one or more dopants (e.g., F and/or B) which decrease the index of refraction, in which case the cladding "down-doped" with respect to pure silica. As used herein, the relative refractive index is represented by delta or $\Delta$ and its values are typically given in units of "%," unless otherwise specified. The terms: relative refractive index delta, delta, $\Delta$, $\Delta\%$, $\%\Delta$, delta %, % delta and percent delta may be used interchangeability herein. In cases where the refractive index of a region is less than that of the cladding, the relative refractive index is negative and is referred to as having a depressed index, and is calculated at the point at which the relative index is most negative unless otherwise specified. In cases where the refractive index of a region is greater than the refractive index of silica, the relative refractive index is positive and the region can be said to be raised or to have a positive index, and is calculated at the point at which the relative index is most positive, unless otherwise specified.

An "up-dopant" is herein considered to be a dopant which has a propensity to raise the refractive index relative to pure undoped $SiO_2$. A "down-dopant" is herein considered to be a dopant which has a propensity to reduce the refractive index relative to pure undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

As used herein, the 1310 nm window is defined as the wavelength range from 1200 nm to 1400 nm, or a subset of this wavelength range. For example, from 1260 to 1400 nm, 1260 to 1360 nm, 1270 to 1350 nm, 1280 to 1340 nm or 1290 to 1330 nm (e.g., 1260 nm, 1290 nm, 1310 nm, 1330 nm, 1350 nm, 1370 nm, or 1400 nm).

As used herein, the 1550 nm window is defined as the wavelength range from 1500 nm to 1600 nm, or a subset of this wavelength range. For example, from 1520 to 1580 nm, 1530 to 1570 nm, 1540 to 1600 nm, 1540 to 1580 nm or 1530 to 1570 nm (e.g., 1500 nm, 1510 nm, 1520 nm, 1530 nm, 1540 nm, 1560 nm, 1570 nm, 1580 nm, 1590 nm or 1600 nm.)

As used herein, numerical aperture of the fiber means numerical aperture as measured using the method set forth in TIA SP3-2839-URV2 FOTP-177 IEC-60793-1-43 titled "Measurement Methods and Text Procedures-Numerical Aperture."

The term graded index, "α-profile" or "alpha profile," as used herein, refers to a relative refractive index profile, expressed in terms of $\Delta$ which is in units of "%", where r is the radius and which follows the equation, $$\Delta(r) = \Delta_0 \left[ 1 - \left(\frac{r}{R_1}\right)^{\alpha} \right],$$

where $\Delta_0$ is the relative refractive index extrapolated to r=0, $R_1$ is the radius of the core (i.e. the radius at which $\Delta(r)$ is zero (see FIG. 1)), and α is an exponent which is a real number. For a step index profile, the alpha value is greater than or equal to 10. For a graded index profile, the alpha value is less than 10. The term "parabolic," as used herein, includes substantially parabolically shaped refractive index profiles which may vary slightly from an α value of 2.0 at one or more points in the core, as well as profiles with minor variations and/or a centerline dip. The modeled refractive index profiles that exemplify the invention have graded index cores which are perfect alpha profiles. An actual fabricated fiber may have minor deviations from a perfect alpha profile, including features such as dips or spikes at the centerline and/or a diffusion tail at the outer interface of the core. However accurate values of alpha and $\Delta_0$ may be obtained by numerically fitting the measured relative refractive index profile to an alpha profile over the radius range from $0.1 R_1 \leq r \leq 0.9 R_1$. In ideal graded index fibers with no imperfections such as dips or spikes at the centerline, $\Delta_0 = \Delta_{1MAX}$, where $\Delta_{1MAX}$ is the maximum refractive index of the core. In other cases, the value from $\Delta_0$ obtained from the numerical fit from $0.1 R_1 \leq r \leq 0.9 R_1$ may be greater or less than $\Delta_{1MAX}$.

Various embodiments of a multimode optical fiber exhibiting a core diameter which provides enhanced performance characteristics are provided. Multimode optical fiber is disclosed having a graded index glass core and a cladding surrounding and in contact with the core. According to the embodiments disclosed herein the core diameter is 41 to about 80 microns. In some exemplary embodiments the core diameter is between about 60 and about 65 microns, which is comparable to the core diameter of commercially available 62.5 micron MMF. In other exemplary embodiments the core diameter is between about 47 to about 53 microns, which is comparable to the core diameter of commercially available 50 micron MMF. In some exemplary embodiments the core diameter is between about 70 and 78 microns, which enables larger alignment tolerances for coupling to optical transceivers. In other exemplary embodiments the core diameter is between about 41 to about 50 microns, which reduces the number of propagating modes in the fiber and enables higher bandwidth.

The core also includes a graded index having an alpha ($\alpha$) value of not less than 1.95 and not greater than 2.04, preferably equal to or less than 2.03, and more preferably between 1.96 and 2.03, and even more preferably between 1.974 and 2.02 (for example, 1.974, 1.975, 1.976, 1.978, 1.979, 1.98, 1.981, 1.982, 1.983, 1.985, 1.99, 2.002, 2.006, 2.007, 2.008, 2.009, 2.01, 2.012, 2.015 or there between). These alpha values enable high fiber bandwidths in the 1310 nm window. The core further has a maximum refractive index in the range between 0.6% and 1.8% (preferably 0.6% to 1.6%), for example, 0.6%, 0.65%, 0.7%, 0.8%, 0.85%, 0.9%, 0.95%, 1%, 1.05%, 1.1%, 1.2%, 1.3%, 1.5%, 1.6%, 1.7%, 1.8%. In some embodiments the core has a maximum refractive index in the range between 0.7% and 1.2%. In other embodiments the core has a maximum refractive index in the range between 0.85% and 1.15%, preferably between 0.88% and 1.1%, and more preferably between 0.9% and 1.05%. For example, in some embodiments the core further has a maximum relative refractive index delta of 0.9%, 0.93%; 0.95%; 0.98%; 1%; or 1.05%.

In the embodiments described herein the cladding includes a depressed-index annular portion. Preferably the cladding comprises an inner annular portion surrounding and in contact with the core, the depressed-index annular portion surrounding the inner annular portion, and an outer annular portions surrounding and in contact with the depressed-index annular portion.

In some embodiments the fiber as an overfilled bandwidth greater than 2500 MHz-km at 1310 nm, and in some embodiments greater than 3750 MHz-km at 1310 nm. In some embodiments the fiber further has an overfilled bandwidth greater than 5000 MHz-km at 1310 nm, and in some embodiments the fiber further has an overfilled bandwidth greater than 6000 MHz-km or even 7500 MHz-km at 1310 nm. In some embodiments, the overfilled bandwidth is greater than 2500 MHz-km at all wavelengths in the range from 1290 to 1330 nm, and in preferred embodiments, is greater than 3750, 5000 or even 7500 MHz-km at all wavelengths in the range from 1290 nm to 1330 nm. In other embodiments, the overfilled bandwidth is greater than 2500 MHz-km at all wavelengths in the range from 1270 to 1350 nm, and in preferred embodiments, is greater than 3750, 5000 or even 7500 MHz-km at all wavelengths in the range from 1270 to 1350 nm. 1 GHz-km is equal to 1000 MHz-km.

In some embodiments the fiber as an overfilled bandwidth greater than 2500 MHz-km at 1550 nm, and in some embodiments greater than 3750 MHz-km at 1550 nm. In some embodiments the fiber further has an overfilled bandwidth greater than 5000 MHz-km at 1550 nm, and in some embodiments the fiber further has an overfilled bandwidth greater than 6000 MHz-km or even 7500 MHz-km at 1550 nm. In some embodiments, the overfilled bandwidth is greater than 2500 MHz-km at all wavelengths in the range from 1530 to 1570 nm, and in preferred embodiments, is greater than 3750, 5000 or even 7500 MHz-km at all wavelengths in the range from 1530 to 1570 nm. In other embodiments, the overfilled bandwidth is greater than 2500 MHz-km at all wavelengths in the range from 1510 to 1590 nm, and in preferred embodiments, is greater than 3750, 5000 or even 7500 MHz-km at all wavelengths in the range from 1510 to 1590 nm. In some embodiments, the overfilled bandwidth is equal to or is greater than 5.0 GHz-km at one or more wavelengths between 1500 nm and 1600 nm.

Referring to FIG. 1, a schematic representation of the refractive index profile of the cross section of the glass portion 10 of a multimode optical fiber 100 is shown, according one embodiment. The glass portion 10 includes a graded index glass core 20 and a glass cladding 60 that surrounds the core 20 and is in contact with the core 20. The core 20 may include silica doped with germanium, according to one embodiment. According to other embodiments, dopants other than germanium, such as $Al_2O_3$ or $P_2O_5$ singly or in combination, may be employed within the core 20, and particularly at or near the centerline of the optical fiber 100. In this embodiment the cladding 60 includes an inner annular portion 30, a depressed-index annular portion 40, and an outer annular portion 50. The inner annular portion 30 surrounds and is in contact with the core 20. The depressed-index annular portion 40 surrounds and is in contact with the inner annular portion 30. The outer annular portion 50 surrounds and is in contact with the depressed-index annular portion 40. The cladding 60 may further include additional portions (not shown) such as further glass portions surrounding the outer annular portion 50. The fiber 100 may further include a protective coating(s) including urethane acrylate and acrylate primary and secondary coatings surrounding the cladding 60.

Figure 2:
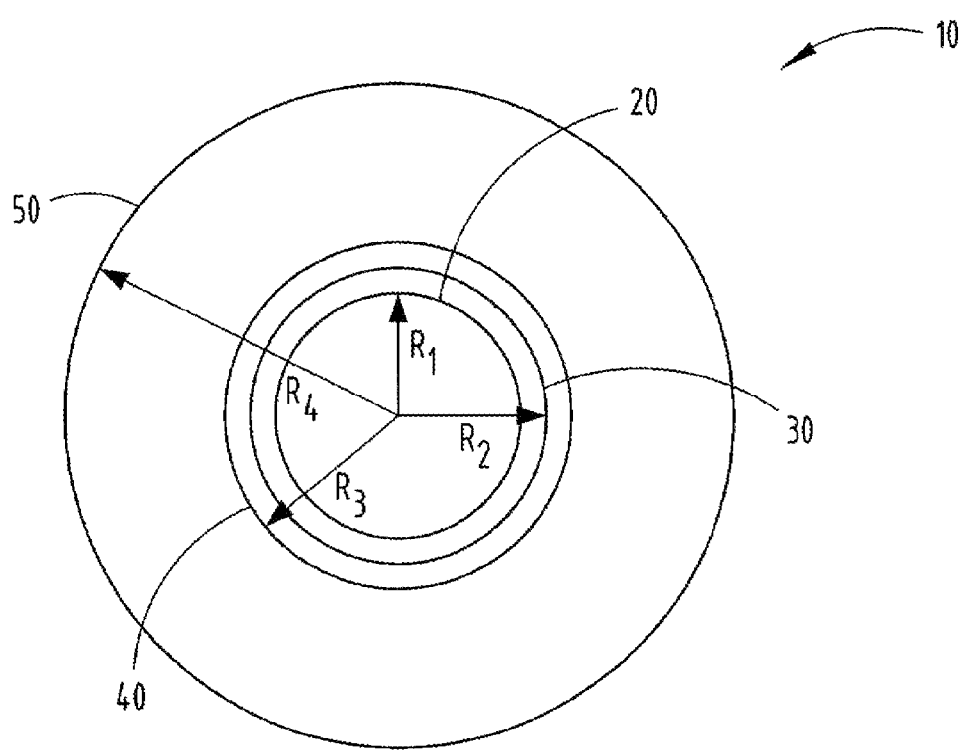
FIG. 2 is a cross-sectional view (not to scale) of the multimode optical fiber of FIG. 1.

Referring to both FIGS. 1 and 2, the glass portion 10 of multimode optical fiber 100 is shown with the core 20 having an outer radius $R_1$. According some embodiments, the core outer radius $R_1$ is of $20.5 > R_1 > 40$ microns, which corresponds to a core diameter between 41 microns and 80 microns. For example, the core diameter may be 41, 42, 45, 48, 50, 55, 60, 62.5, 65, 70, 72, 75, 78 or 80 microns, or therebetween. In some embodiments the graded index core has an alpha ($\alpha$) value of not greater than 2.04. For example, in some embodiments ($\alpha$) value is between 1.9 and 2.04. In some embodiments the graded index core has an alpha ($\alpha$) value is between 1.98 and 2.02. In these embodiments, preferably, the glass core 20 further has a maximum relative refractive index $\Delta_{1MAX}$ in the range of 0.6% to 1.6%, and in some embodiments is in the range of 0.7% to 1.2%.

In some embodiments the graded index core has an alpha ($\alpha$) value is between 1.95 and 1.99 and preferably between 1.975 and 1.985. In these embodiments, preferably, the glass core 20 further has a maximum relative refractive index $\Delta_{1MAX}$ in the range of 0.7% to 1.6%, for example between 1.75% and 1.55%

For example, in some embodiments $\alpha$ is 1.95, 1.97, 1.975, 1.976, 1.977, 1.978, 1.98, 1.981, 1.982, 1.982, 1.983, 1.984, 1.985, 1.987, 1.99, 2.0, 2.005, 2.007, 2.009, 2.01, 2.015, 2.02, 2.03 or 2.04, or therebetween.

According to one embodiment, the core outer radius $R_1$ is in the range of 22.5 to 27.5 microns, which corresponds to a core diameter in the range of 45 microns to 55 microns. In some embodiments the graded index core has an alpha ($\alpha$) value of less than 2.04. For example, according to one embodiment, the glass core 20 has a graded index having an alpha ($\alpha$) value of about 1.97 to about 2.02. In this embodiment the glass core 20 further has a maximum relative refractive index $\Delta_{1MAX}$ in the range of 0.9% to 1.1%. According to another embodiment, the core graded index has an alpha between 1.975 and 2.02 and the core 20 has a maximum relative refractive index $\Delta_{1MAX}$ in the range of 0.95% to 1.05%.

According to one embodiment, the core outer radius $R_1$ is in the range of 22.5 to 27.5 microns, which corresponds to a core diameter in the range of 45 microns to 55 microns. In some embodiments the graded index core has an alpha (α) value of less than 2.04. For example, according to one embodiment, the glass core 20 has a graded index having an alpha (α) value of about 1.97 to about 2.02. In this embodiment the glass core 20 further has a maximum relative refractive index $\Delta_{1MAX}$ in the range of 0.9% to 1.1%. According to another embodiment, the core graded index has an alpha between 1.975 and 2.02 and the core 20 has a maximum relative refractive index $\Delta_{1MAX}$ in the range of 0.95% to 1.05%.

The inner cladding portion 30 of cladding 60 has an outer radius $R_2$, a width $W_2$, relative refractive index $\Delta_2$, and a maximum relative refractive index $\Delta_{2MAX}$. $R_2$ is defined as the radius at which the derivative of the normalized refractive index profile (also known as the normalized slope and the normalized first derivative, herein) with respect to the normalized radius, $d(\Delta/\Delta_{1MAX})/d(r/R_1)$, is equal to −2.5, as shown in FIG. 3A. The refractive index $\Delta_2$ is the relative refractive index at the radius at which the first derivative $d(\Delta/\Delta_{1max})/d(r/R_1)$ is equal to −2.5, $\Delta_{1max}$ being the maximum core delta and $R_1$ being the core radius estimated by fitting the core index profile to an alpha profile, as described further below. The width $W_2$ of the inner cladding portion 30 may be in the range of 0.5 to 4.0 microns, and according to some embodiments preferably between 0.5 and 2.5 microns, for example 0.5 μm≤$W_2$≤2.5 μm. The outer radius $R_2$ of the inner cladding portion 30 is preferably in the range of 23 to 40 microns. In some embodiments, the maximum relative refractive index $\Delta_{2MAX}$ of the inner cladding is less than about 0.1%. In other embodiments, the maximum relative refractive index $\Delta_{2MAX}$ of the inner cladding is less than about 0.0%. In other embodiments, the maximum relative refractive index $\Delta_{2MAX}$ of the inner cladding is between about −0.1% and about 0.1%.

The depressed-index annular portion 40 of cladding 60 has a minimum relative refractive index $\Delta_{3MIN}$ and extends from $R_2$ to $R_3$, wherein $R_3$ is the radius at which $\Delta_3(r)$ first reaches a value of greater than −0.05%, going radially outwardly from the radius at which $\Delta_3(r)=\Delta_{3MIN}$. The depressed-index annular portion 40 has a radial width $W_3=R_3-R_2$. In one embodiment, the depressed-index annular portion 40 has a width $W_3$ of at least 1 micron. $W_3$ is preferably between 2 microns and 10 microns, more preferably between 2 microns and 8 microns and even more preferably between 2 microns and 6 microns. The depressed-index annular portion 40 may have an outer radius $R_3$ in the range of 27 to 45 microns, more preferably 28 to 32 microns, for example 30 to 45 microns, or 35 to 45 microns. The depressed-index annular portion 40 has a minimum relative refractive index $\Delta_{3MIN}$ less than about −0.2%, and more preferably refractive index $\Delta_{3MIN}$ may be in the range of −0.3% to −0.7%. The low index ring has a minimum relative refractive $\Delta_{3MIN}$ which is less than or equal to $\Delta_2$ and also less than $\Delta_{1MAX}$.

The depressed-index annular portion has a profile volume, $V_3$, defined herein as:

$$V_3 = 2\int_{R_2}^{R_3} \Delta_3(r)rdr$$

where $R_2$ is the radius of the depressed-index annular portion as defined above, and $R_3$ is the outer radius of the depressed-index annular portion as defined above. For the fibers disclosed herein, the absolute magnitude of $V_3$ is preferably greater than 20%-μm², in some embodiments greater than 40%-μm², in other embodiments greater than 60%-μm², more preferably greater than 80%-μm², for example: greater than 90%-μm², greater than 95%-μm², greater than 100%-μm², or greater than 110%-μm². In some preferred embodiments, the absolute magnitude of $V_3$ is greater than 60%-μm² and less than 200%-μm². In other preferred embodiments, the absolute magnitude of $V_3$ is greater than 80%-μm² and less than 160%-μm². In other preferred embodiments, the absolute magnitude of $V_3$ is greater than 80%-μm² and less than 140%-μm². In other preferred embodiments, the absolute magnitude of $V_3$ is greater than 60%-μm² and less than 120%-μm².

In some embodiments, the depressed-index annular portion 40 comprises silica doped with fluorine and/or boron. In some other embodiments, the depressed-index annular portion 40 comprises voids, either non-periodically disposed, or periodically disposed, or both. By "non-periodically disposed" or "non-periodic distribution", we mean that when one takes a cross section (such as a cross section perpendicular to the longitudinal axis) of the optical fiber, the non-periodically disposed voids are randomly or non-periodically distributed across a portion of the fiber. Similar cross sections taken at different points along the length of the fiber will reveal different cross-sectional hole patterns, i.e., various cross sections will have different hole patterns, wherein the distributions of voids and sizes of voids do not match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. The voids can contain one or more gases, such as argon, nitrogen, krypton, $CO_2$, $SO_2$, or oxygen, or the voids can contain a vacuum with substantially no gas; regardless of the presence or absence of any gas, the refractive index in the annular portion 50 is lowered due to the presence of the voids. While not wishing to be bound by theory, it is believed that the voids extend less than a few meters, and in many cases less than 1 meter along the length of the fiber. Optical fiber 100 disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or voids, therein. As used herein, the diameter of a hole is the longest line segment whose endpoints are disposed on the silica internal surface defining the hole when the optical fiber is viewed in perpendicular cross-section transverse to the longitudinal axis of the fiber.

According to some embodiments, the outer annular portion 50 of cladding 60 has an outer radius $R_4$ and has relative refractive index $\Delta_4$ which is greater than $\Delta_2$ and greater than $\Delta_{3MIN}$ and less than $\Delta_{1MAX}$. Accordingly, $\Delta_{1MAX}>\Delta_4>\Delta_2>\Delta_{3MIN}$ in this embodiment. However, it should be understood that other embodiments are possible. For example, $\Delta_4$ may be equal to $\Delta_2$ (see Table 1, for example). Alternatively, $\Delta_2$ may be greater than $\Delta_4$. According to one embodiment, the outer radius $R_4$ is about 62.5 microns, thereby resulting in an outer fiber diameter of about 125 microns.

The refractive index profile of a radially symmetric optical fiber depends on the radial coordinate r and is independent of the azimuthal coordinate φ. In most optical fibers, including the examples disclosed below, the refractive index profile exhibits only a small index contrast, and the fiber can be assumed to be only weakly guiding. If both of these conditions are satisfied, Maxwell's equations can be reduced to the scalar wave equation, the solutions of which are linearly polarized (LP) modes.

For a given wavelength, the radial equation of the scalar wave equation for a given refractive index profile has solutions which tend to zero for r going to infinity only for certain discrete values of the propagation constant β. These eigenvectors (transverse electric field) of the scalar wave equation are guided modes of the fiber, and the eigenvalues are the propagation constants $\beta_{1m}$, where 1 is the azimuthal index and m is the radial index. In a graded index fiber, the LP modes can be divided into groups, designated by common values of the principle mode number, p=l+2m−1. The modes in these groups have nearly degenerate propagation constants and cutoff wavelengths and tend to propagate through the fiber with the same group velocity.

The numerical aperture (NA) is defined as the sine of the maximum angle (relative to the axis of the fiber) of the incident light that becomes completely confined in the fiber by total internal reflection. It can be shown that this condition yields the relationship $NA=\sqrt{n_1^2-n_{cl}^2}$, where $n_1$ is the maximum refractive index of the graded index core. Using the definition of delta (Δ), this expression can be transformed into the following equation:

$$NA = n_1\sqrt{2\Delta} = n_{cl}\sqrt{\frac{2\Delta}{1-2\Delta}}$$

The overfilled bandwidth at a given wavelength is measured according to measurement standard FOTP-204 using an overfilled launch. The modeled bandwidth may be calculated according to the procedure outlined in T. A. Lenahan, "Calculation of Modes in an Optical Fiber Using the Finite Element Method and EISPACK," Bell Sys. Tech. J., vol. 62, pp. 2663-2695 (1983), the entire disclosure of which is hereby incorporated herein by reference. Equation 47 of this reference is used to calculate the modal delays; however note that the term $dk_{cl}/d\omega^2$ must be replaced with $dk^2_{cl}/d\omega^2$, where $k_{cl}=2\pi^*n_{cl}/\lambda$ and $\omega=2\pi/\lambda$. The modal delays are typically normalized per unit length and given in units of ns/km. The calculated bandwidths also assume that the refractive index profile is ideal, with no perturbations such as a centerline dip, and as a result, represent the maximum bandwidth for a given design.

Macrobend performance was determined according to FOTP-62 (IEC-60793-1-47) by wrapping 2 turns around a either a 10 mm, 20 mm or 30 mm diameter mandrel (e.g. "2×10 mm diameter macrobend loss" or the "2×20 mm diameter macrobend loss") and measuring the increase in attenuation due to the bending using an encircled flux (EF) launch condition. The encircled flux was obtained by launching an overfilled pulse into an input end of a 2 m length of conventional (i.e. not bend-insensitive) 50 μm multimode optical fiber, which was deployed with a 1×25 mm diameter mandrel near the midpoint. The standard 50 micron multimode fiber has a core diameter of about 50 microns, a numerical aperture of about 0.2 and a refractive index profile comprising a graded index core and a homogeneous cladding. The output end of the standard 50 μm optical fiber was spliced to the fiber under test, and the measured bend loss is the ratio of the attenuation under the prescribed bend condition to the attenuation without the bend.

Multimode fiber 100 has an overfilled bandwidth greater than 2500 MHz-km at at least one wavelength between 1290 nm and 1610 nm, and a numerical aperture NA less than 0.26, and preferably 0.16 to 0.26, more preferably 0.17 to 0.21. Preferably, the overfilled bandwidth is greater than 3750 MHz-km at either 1310 or 1550 nm, and in some embodiments greater than 5000 MHz-km at 1310 nm at either 1310 or 1550 nm. Some fiber embodiments disclosed herein have the overfilled bandwidth is greater than 6000 MHz-km at 1310 nm, and in some fiber embodiments have the overfilled bandwidth is greater than 7500 MHz-km at 1310 nm. In some embodiments, the overfilled bandwidth is greater than 2500 MHz-km at all wavelengths in the range from 1290 to 1330 nm, and in preferred embodiments, is greater than 3750 MHz-km, 5000 MHz-km or even 7500 MHz-km at all wavelengths in the range from 1290 to 1330 nm. In other embodiments, the overfilled bandwidth is greater than 2500 MHz-km at all wavelengths in the range from 1270 to 1350 nm, and in preferred embodiments, is greater than 3750, 5000 or even 7500 MHz-km at all wavelengths in the range from 1270 nm to 1350 nm.

Some fiber embodiments disclosed herein have the overfilled bandwidth is greater than 6000 MHz-km at 1350 nm, and in some fiber embodiments have the overfilled bandwidth is greater than 7500 MHz-km at 1350 nm. In some embodiments, the overfilled bandwidth is greater than 2500 MHz-km at all wavelengths in the range from 1530 to 1570 nm, and in preferred embodiments, is greater than 3750 MHz-km, 5000 MHz-km or even 7500 MHz-km at all wavelengths in the range from 1530 to 1570 nm. In other embodiments, the overfilled bandwidth is greater than 2500 MHz-km at all wavelengths in the range from 1510 nm to 1590 nm, and in preferred embodiments, is greater than 3750, 5000 or even 7500 MHz-km at all wavelengths in the range from 1510 to 1590 nm.

Some fiber embodiments disclosed herein have a 2×10 mm macrobend loss less than 2 dB at 1310 nm, and other fiber embodiments have a 2×10 mm macrobend loss less than 1.5 dB at 1310 nm. In some embodiments, the 2×10 mm macrobend loss is less than 1.0 dB and in some examples is even less than 0.8 dB at 1310 nm. Some fiber embodiments disclosed herein have a 2×15 mm macrobend loss less than 0.7 dB at 1310 nm, and other fiber embodiments have a 2×15 mm macrobend loss less than 0.5 dB at 1310 nm. In some embodiments, the 2×15 mm macrobend loss is less than 0.4 dB and in some examples is even less than 0.3 dB at 1310 nm. Some fiber embodiments disclosed herein have a 2×20 mm macrobend loss less than 0.6 dB, and other fiber embodiments have a 2×20 mm macrobend loss less than 0.4 dB at 1310 nm. In some embodiments, the 2×20 mm macrobend loss is less than 0.3 dB and in some examples is even less than 0.2 dB at 1310 nm.

Some fiber embodiments disclosed herein have a 2×10 mm macrobend loss less than 2 dB at 1550 nm, and other fiber embodiments have a 2×10 mm macrobend loss less than 1.5 dB at 1550 nm. In some embodiments, the 2×10 mm macrobend loss is less than 1.0 dB and in some examples is even less than 0.8 dB at 1550 nm. Some fiber embodiments disclosed herein have a 2×15 mm macrobend loss less than 0.7 dB at 1550 nm, and other fiber embodiments have a 2×15 mm macrobend loss less than 0.5 dB at 1550 nm. In some embodiments, the 2×15 mm macrobend loss is less than 0.4 dB and in some examples is even less than 0.3 dB at 1550 nm. Some fiber embodiments disclosed herein have a 2×20 mm macrobend loss less than 0.6 dB, and other fiber embodiments have a 2×20 mm macrobend loss less than 0.4 dB at 1550 nm. In some embodiments, the 2×20 mm macrobend loss is less than 0.3 dB and in some examples is even less than 0.2 dB at 1550 nm.

EXAMPLES

Tables 1-4 summarizes various examples generally arranged in four sets of embodiments of multimode fibers that were modeled having various characteristics in accordance with the invention disclosed herein and shown in FIG. 1. Various optical properties of the multi-mode fibers were modeled from the refractive index profile parameters. These parameters include the relative refractive index $\Delta_{1MAX}$ of the core, outer core radius $R_1$, and the graded index alpha ($\alpha$) parameter. Additionally, the parameters include the relative refractive index $\Delta_2$ of the inner annular portion 40, the radius $R_2$ of the inner annular portion 40, and the width $W_2$ of the inner annular portion 40. Further, the parameters include the minimum relative refractive index $\Delta_{3MIN}$ of the depressed-index annular portion 50, and the outer radius $R_3$ of the depressed-index annular portion 50. Further calculations include the overfilled bandwidth at 1270 nm, 1280 nm, 1290 nm, 1310 nm, 1330 nm, 1340 nm and 1350 nm, the number of propagating LP modes at 1310 nm, the dispersion and dispersion slope at 1310 nm, the attenuation at 1310 nm, the core diameter in microns, and the numerical aperture. In the examples of Tables 1-4, the fiber has a high overfilled bandwidth (BW) in the 1310 nm window due (a) to the core having an ($\alpha$) value between 1.95 and 2.04, and (b) the optimized width $W_2$ of the inner annular portion 40. The optimum width for each embodiment depends on the maximum relative refractive indices of the core, the inner annular portion and the depressed index annular portion. These refractive index profiles enable an overfilled bandwidth greater than 2500 MHz-km at 1310 nm, and in some preferred embodiments, the overfilled bandwidth at 1310 nm is greater than 3750, 5000 or even 7500 MHz-km. In some embodiments, the overfilled bandwidth is greater than 2500 MHz-km at all wavelengths in the range from 1290 to 1330 nm, and in preferred embodiments, is greater than 3750, 5000 or even 7500 MHz-km at all wavelengths in the range from 1290 to 1330 nm. In other embodiments, the overfilled bandwidth is greater than 2500 MHz-km at all wavelengths in the range from 1270 to 1350 nm, and in preferred embodiments, is greater than 3750, 5000 or even 7500 MHz-km at all wavelengths in the range from 1270 to 1350 nm.

Table 1 presents eight modeled embodiments in which the multimode fiber 100 exhibits a core diameter between 45 and 55 microns and the core has a maximum relative refractive index $\Delta_{1MAX}$ between 0.9% and 1%. In these exemplary fiber embodiments, $1.98 \leq \alpha \leq 2.04$, and in preferred embodiments is in the range $1.99 \leq \alpha \leq 2.03$. The overfilled bandwidth is greater than 7500 MHz-km (7.5 GHz-km) at 1310 nm, and in some embodiments, is greater than 10 GHz-km or even 15 GHz-km at 1310 nm. The numerical apertures of these embodiments are between 0.185 and 0.215. The dispersion is less than 5 ps/nm/km at 1310 nm, and the attenuation is less than 0.7 dB/km at 1310 nm.

TABLE 1

| Parameter | Example 1 | Example 2 | Example 3 | Example 4 | Example 5 | Example 6 | Example 7 |
|---|---|---|---|---|---|---|---|
| $\Delta_{1MAX}$ (%) | 0.98 | 0.98 | 0.98 | 0.98 | 0.99 | 0.99 | 0.99 |
| R1 (microns) | 24.80 | 23.54 | 23.67 | 23.72 | 25.00 | 24.6 | 24.6 |
| $\alpha$ | 2.007 | 2.007 | 2.007 | 2.007 | 2.008 | 2.007 | 2.007 |
| R2 (microns) | 25.67 | 24.43 | 24.66 | 24.83 | 26.27 | 25.24 | 25.76 |
| $\Delta_2$ (%) | 0 | 0 | 0 | 0 | 0 | 0 | 0 |
| W2 (microns) | 0.86 | 0.89 | 0.99 | 1.11 | 1.27 | 0.63 | 1.16 |
| R3 (microns) | 32 | 30 | 30 | 30 | 31 | 31.5 | 31.5 |
| $\Delta_{3MIN}$ (%) | −0.3 | −0.34 | −0.4 | −0.48 | −0.55 | −0.29 | −0.29 |
| W3 (microns) | 6.34 | 5.58 | 5.34 | 5.17 | 4.74 | 6.27 | 5.74 |
| V3 (% microns$^2$) | 110 | 103 | 117 | 136 | 149 | 103 | 95 |
| R4 (microns) | 62.5 | 62.5 | 62.5 | 62.5 | 62.5 | 62.5 | 62.5 |
| $\Delta_4$ (%) | 0 | 0 | 0 | 0 | 0 | 0.03 | −0.02 |
| LP Modes | 42 | 36 | 36 | 36 | 42 | 36 | 42 |
| BW1270 (GHz-km) | 8.77 | 9.27 | 9.36 | 8.92 | 7.77 | 10.66 | 8.15 |
| BW1280 (GHz-km) | 10.62 | 11.21 | 11.22 | 10.91 | 9.34 | 12.96 | 9.81 |
| BW1290 (GHz-km) | 13.04 | 13.77 | 13.87 | 13.50 | 11.54 | 15.02 | 12.05 |
| BW1310 (GHz-km) | 16.40 | 17.78 | 17.83 | 17.77 | 15.24 | 19.53 | 15.82 |
| BW1320 (GHz-km) | 17.26 | 12.83 | 12.28 | 12.10 | 9.77 | 14.45 | 17.45 |
| BW1330 (GHz-km) | 14.18 | 10.14 | 9.56 | 9.30 | 7.31 | 11.54 | 14.72 |
| BW1340 (GHz-km) | 11.51 | 8.15 | 7.61 | 7.31 | 11.41 | 9.37 | 12.04 |
| Dispersion at 1310 nm (ps/nm/km) | 0.42 | 0.42 | 0.42 | 0.42 | 0.37 | 0.48 | 0.48 |
| Dispersion Slope at 1310 nm (ps/nm$^2$/km) | 0.10 | 0.10 | 0.10 | 0.10 | 0.10 | 0.10 | 0.10 |
| Attenuation at 1310 nm (dB/km) | 0.33 | 0.33 | 0.33 | 0.33 | 0.33 | 0.33 | 0.33 |
| Core Diameter (microns) | 49.6 | 47.08 | 47.34 | 47.44 | 50 | 49.2 | 49.2 |
| Numerical Aperture | 0.206 | 0.207 | 0.207 | 0.207 | 0.208 | 0.205 | 0.205 |

Table 2 presents seven embodiments in which the multimode fiber 100 exhibits a core diameter between 41 and 80 microns and the core has a maximum relative refractive index $\Delta_{1MAX}$ between 0.8% and 1.3%. In these exemplary fiber embodiments, $1.98 \leq \alpha \leq 2.04$, and in preferred embodiments is in the range $1.99 \leq \alpha \leq 2.03$. The overfilled bandwidth is greater than 7500 MHz-km (7.5 GHz-km) at 1310 nm, and in some embodiments, is greater than 10 GHz-km or even 15 GHz-km at 1310 nm. The numerical apertures of these embodiments are between 0.185 and 0.215. The magnitude of the dispersion is less than 5 ps/nm/km at 1310 nm, and the attenuation is less than 0.7 dB/km at 1310 nm.

TABLE 2

| Parameter | Example 8 | Example 9 | Example 10 | Example 11 | Example 12 | Example 13 | Example 14 |
|---|---|---|---|---|---|---|---|
| $\Delta_{1MAX}$ (%) | 0.90 | 0.99 | 0.98 | 1.00 | 1.10 | 1.10 | 1.20 |
| R1 (microns) | 23.4 | 32 | 31.25 | 20.5 | 35.6 | 25 | 29 |
| α | 2.008 | 2.006 | 2.006 | 2.008 | 2.005 | 2.006 | 2.005 |
| R2 (microns) | 24.47 | 33.13 | 32.36 | 21.32 | 36.97 | 25.82 | 30.11 |
| Δ2 (%) | 0 | 0 | 0 | 0 | 0 | 0 | 0 |
| W2 (microns) | 1.07 | 1.13 | 1.11 | 0.82 | 1.37 | 0.82 | 1.11 |
| R3 (microns) | 30.8 | 38 | 39 | 27 | 41 | 31 | 36 |
| $\Delta_{3MIN}$ (%) | -0.4 | -0.32 | -0.3 | -0.35 | -0.42 | -0.32 | -0.44 |
| W3 (μm) | 6.33 | 4.87 | 6.64 | 5.68 | 4.03 | 5.18 | 5.90 |
| V3 (% microns$^2$) | 140 | 111 | 142 | 96 | 132 | 94 | 171 |
| R4 (microns) | 62.5 | 62.5 | 62.5 | 62.5 | 62.5 | 62.5 | 62.5 |
| Δ4 (%) | 0 | 0 | 0 | 0 | 0 | 0 | 0 |
| LP Modes | 30 | 64 | 64 | 30 | 90 | 42 | 36 |
| BW1270 (GHz-km) | 11.29 | 9.83 | 8.63 | 8.13 | 7.30 | 8.73 | 7.3732 |
| BW1280 (GHz-km) | 12.67 | 11.30 | 10.33 | 9.83 | 8.51 | 10.42 | 8.3911 |
| BW1290 (GHz-km) | 12.12 | 13.81 | 12.56 | 12.17 | 10.03 | 11.87 | 9.8637 |
| BW1310 (GHz-km) | 24.47 | 17.11 | 15.91 | 16.53 | 12.32 | 15.40 | 11.5609 |
| BW1320 (GHz-km) | 16.84 | 12.10 | 16.40 | 19.60 | 9.24 | 12.16 | 8.6346 |
| BW1330 (GHz-km) | 12.65 | 9.56 | 13.55 | 16.52 | 10.33 | 9.90 | 6.9373 |
| BW1340 (GHz-km) | 9.81 | 7.68 | 11.00 | 13.30 | 8.68 | 8.11 | 5.5955 |
| Dispersion at 1310 nm (ps/nm/km) | 0.77 | 0.37 | 0.43 | 0.46 | -0.01 | 0.05 | -0.33 |
| Dispersion Slope at 1310 nm (ps/nm2/km) | 0.10 | 0.10 | 0.10 | 0.10 | 0.10 | 0.10 | 0.1 |
| Attenuation at 1310 nm (dB/km) | 0.33 | 0.33 | 0.33 | 0.33 | 0.33 | 0.33 | 0.326 |
| Core Diameter (microns) | 46.8 | 64 | 62.5 | 41 | 71.2 | 50 | 58 |
| Numerical Aperture | 0.196 | 0.206 | 0.205 | 0.207 | 0.217 | 0.217 | 0.226 |

Table 3 presents six embodiments in which the multimode fiber 100 exhibits a core diameter between 41 and 80 microns and the core has a maximum relative refractive index $\Delta_{1MAX}$ between 0.6% and 1.6%. In these exemplary fiber embodiments, 1.98≤α≤2.04, and in preferred embodiments is in the range 1.99≤α≤2.03. The overfilled bandwidth is greater than 7500 MHz-km (7.5 GHz-km) at 1310 nm, and in some embodiments, is greater than 10 GHz-km or even 15 GHz-km at 1310 nm. The magnitude of the dispersion is less than 5 ps/nm/km at 1310 nm, and the attenuation is less than 0.7 dB/km at 1310 nm. In a subset of these embodiments, the core diameter is between 50 and 80 microns, and the core has a maximum relative refractive index $\Delta_{1MAX}$ between 1.3% and 1.6%. The numerical aperture of this subset of the embodiments is between 0.23 and 0.26. In another subset of these embodiments, the core diameter is between 41 and 50 microns, and the core has a maximum relative refractive index $\Delta_{1MAX}$ between 0.6% and 0.9%. The numerical aperture of this subset of the embodiments is between 0.16 and 0.19.

TABLE 3

| Parameter | Example 15 | Example 16 | Example 17 | Example 18 | Example 19 | Example 20 |
|---|---|---|---|---|---|---|
| $\Delta_{1MAX}$ (%) | 1.35 | 1.36 | 1.55 | 1.50 | 0.65 | 0.65 |
| R1 (microns) | 31.25 | 25.00 | 31.25 | 37.50 | 21.10 | 24.50 |
| α | 2.005 | 2.007 | 2.005 | 2.005 | 2.009 | 2.007 |
| R2 (microns) | 32.035 | 25.69 | 31.94 | 38.94 | 22.04 | 25.71 |
| Δ2 (%) | 0 | 0 | 0 | 0 | 0 | 0 |
| W2 (microns) | 0.78 | 0.69 | 0.69 | 1.44 | 0.94 | 1.21 |
| R3 (microns) | 39.00 | 32.00 | 39.00 | 43.50 | 29.00 | 31.00 |
| $\Delta_{3MIN}$ (%) | -0.28 | -0.32 | -0.28 | -0.65 | -0.25 | -0.32 |
| W3 (microns) | 6.97 | 6.31 | 7.06 | 4.56 | 6.96 | 5.29 |
| V3 (% microns$^2$) | 139 | 116 | 140 | 244 | 89 | 96 |
| R4 (microns) | 62.5 | 62.5 | 62.5 | 62.5 | 62.5 | 62.5 |
| Δ4 (%) | 0 | 0 | 0 | 0 | 0 | 0 |
| LP Modes | 81 | 56 | 100 | 132 | 20 | 25 |
| BW1270 (GHz-km) | 6.84 | 7.79 | 6.41 | 5.19 | 11.36 | 8.72 |
| BW1280 (GHz-km) | 7.54 | 8.52 | 6.32 | 5.37 | 13.57 | 12.24 |
| BW1290 (GHz-km) | 7.95 | 8.76 | 5.93 | 5.90 | 16.84 | 14.70 |
| BW1310 (GHz-km) | 8.55 | 7.55 | 4.79 | 5.08 | 29.90 | 21.82 |
| BW1320 (GHz-km) | 6.61 | 5.74 | 4.34 | 4.06 | 34.67 | 21.52 |
| BW1330 (GHz-km) | 5.73 | 5.00 | 3.84 | 3.57 | 25.08 | 17.18 |
| BW1340 (GHz-km) | 5.00 | 5.20 | 3.43 | 3.59 | 18.24 | 13.41 |
| Dispersion at 1310 nm (ps/nm/km) | -0.91 | -0.88 | -1.67 | -1.52 | 1.64 | 1.61 |
| Dispersion Slope at 1310 nm (ps/nm$^2$/km) | 0.10 | 0.10 | 0.10 | 0.10 | 0.10 | 0.10 |
| Attenuation at 1310 nm (dB/km) | 0.33 | 0.33 | 0.33 | 0.33 | 0.33 | 0.33 |

TABLE 3-continued

| Parameter | Example 15 | Example 16 | Example 17 | Example 18 | Example 19 | Example 20 |
|---|---|---|---|---|---|---|
| Core Diameter (microns) | 62.5 | 50 | 62.5 | 75 | 42.2 | 49 |
| Numerical Aperture | 0.241 | 0.241 | 0.259 | 0.254 | 0.166 | 0.166 |

Table 4 presents eight embodiments in which the multi-mode fiber 100 exhibits a core diameter between 41 and 80 microns and the core has a maximum relative refractive index $\Delta_{1MAX}$ between 0.6% and 0.9%. In these exemplary fiber embodiments, $1.98 \leq \alpha \leq 2.04$, and in preferred embodiments is in the range $1.99 \leq \alpha \leq 2.03$. The overfilled bandwidth is greater than 7500 MHz-km (7.5 GHz-km) at 1310 nm, and in some embodiments, is greater than 10 GHz-km or even 15 GHz-km at 1310 nm. The magnitude of the dispersion is less than 5 ps/nm/km at 1310 nm, and the attenuation is less than 0.7 dB/km at 1310 nm. The numerical apertures of these embodiments are between 0.16 and 0.19. In some embodiments, the core diameter is between 45 and 55 microns, in other embodiments the core diameter is in between 60 and 65 microns, and in other embodiments, the core diameter is in between 41 and 50 microns.

at 1310 nm. In some embodiments, the overfilled bandwidth is greater than 2500 MHz-km at all wavelengths in the range from 1290 nm to 1330 nm, and in preferred embodiments, is greater than 3750, 5000 or even 7500 MHz-km at all wavelengths in the range from 1290 nm to 1330 nm. In other embodiments, the overfilled bandwidth is greater than 2500 MHz-km at all wavelengths in the range from 1270 nm to 1350 nm, and in preferred embodiments, is greater than 3750, 5000 or even 7500 MHz-km at all wavelengths in the range from 1270 nm to 1350 nm.

The fiber examples in Table 1 illustrate that a multi-mode fiber with a graded index core diameter in the range of 45 microns to 55 microns and a cladding surrounding the core and comprising a depressed-index annular portion. These fiber examples have an overfilled bandwidth greater than 2.5 GHz-km at 1310 nm. More specifically, the fibers of Table 1 have overfilled bandwidths greater than 5 GHz-km at 1310

TABLE 4

Refractive index profile parameters and modeled bandwidths.

| Parameter | Example 21 | Example 22 | Example 23 | Example 24 | Example 25 | Example 26 | Example 27 | Example 28 |
|---|---|---|---|---|---|---|---|---|
| $\Delta_{1MAX}$ (%) | 0.75 | 0.75 | 0.75 | 0.752 | 0.756 | 0.755 | 0.749 | 0.79 |
| R1 (microns) | 31.25 | 25 | 25 | 25 | 25 | 25 | 20.52 | 24.7 |
| α | 2.009 | 2.009 | 2.010 | 2.010 | 2.011 | 2.010 | 2.010 | 2.010 |
| R2 (microns) | 32.83 | 26.15 | 26.36 | 26.46 | 26.56 | 26.62 | 21.47 | 25.41 |
| Δ2 (%) | 0 | 0 | 0 | 0 | 0 | 0 | 0 | 0 |
| W2 (microns) | 1.58 | 1.15 | 1.36 | 1.46 | 1.56 | 1.62 | 0.95 | 0.71 |
| R3 (μm) | 38 | 31.5 | 30.5 | 31 | 31 | 31 | 28 | 31.5 |
| $\Delta_{3MIN}$ (%) | -0.4 | -0.32 | -0.44 | -0.5 | -0.6 | -0.67 | -0.32 | -0.32 |
| W3 (microns) | 5.17 | 5.36 | 4.14 | 4.54 | 4.45 | 4.38 | 6.53 | 6.09 |
| V3 (%-sq. microns) | 146 | 99 | 104 | 130 | 153 | 169 | 103 | 111 |
| R4 (microns) | 62.5 | 62.5 | 62.5 | 62.5 | 62.5 | 62.5 | 62.5 | 62.5 |
| Δ4 (%) | 0 | 0 | 0 | 0 | 0 | 0 | 0 | 0.04 |
| LP Modes | 49 | 30 | 30 | 30 | 30 | 30 | 20 | 30 |
| BW1270 (GHz-km) | 9.92 | 11.24 | 11.91 | 10.97 | 11.23 | 10.40 | 13.88 | 12.29 |
| BW1280 (GHz-km) | 11.91 | 13.71 | 14.80 | 13.76 | 15.15 | 13.27 | 17.96 | 15.29 |
| BW1290 (GHz-km) | 14.84 | 17.44 | 19.31 | 17.71 | 19.95 | 17.09 | 24.08 | 19.88 |
| BW1310 (GHz-km) | 21.89 | 29.13 | 29.79 | 29.76 | 29.88 | 29.01 | 36.97 | 30.11 |
| BW1320 (GHz-km) | 14.35 | 20.92 | 16.96 | 18.32 | 15.62 | 17.16 | 20.14 | 18.24 |
| BW1330 (GHz-km) | 10.44 | 15.19 | 12.32 | 12.99 | 11.25 | 12.03 | 14.87 | 13.52 |
| BW1340 (GHz-km) | 19.43 | 11.50 | 9.41 | 9.71 | 8.54 | 8.92 | 11.56 | 18.29 |
| Dispersion at 1310 nm (ps/nm/km) | 1.22 | 1.27 | 1.27 | 1.26 | 1.25 | 1.25 | 1.32 | 1.27 |
| Dispersion Slope at 1310 nm (ps/nm²/km) | 0.10 | 0.10 | 0.10 | 0.10 | 0.10 | 0.10 | 0.10 | 0.10 |
| Attenuation at 1310 nm (dB/km) | 0.32 | 0.33 | 0.33 | 0.33 | 0.33 | 0.33 | 0.33 | 0.33 |
| Core Diameter (microns) | 62.5 | 50 | 50 | 50 | 50 | 50 | 41.04 | 49.4 |
| Numerical Aperture | 0.179 | 0.179 | 0.179 | 0.179 | 0.179 | 0.179 | 0.178 | 0.179 |

As can be seen from Tables 1-4, each of the fiber Examples 1-28 have overfilled bandwidths at 1310 nm greater than 2500 MHz-km. According to some at least some embodiments, the fibers have an overfilled bandwidth greater than 5000 MHz-km at 1310 nm. According to at least some embodiments the fibers have an overfilled bandwidth greater than 7.5 GHz-km at 1310 nm. According to at least some embodiments the fibers have an overfilled bandwidth greater than 10 GHz-km at 1310 nm. According to at least some embodiments the fibers have an overfilled bandwidth greater than 20 GHz-km nm, and even greater than 10 GHz-km at 1310 nm. Similarly, Table 2 illustrates fibers with overfilled bandwidths greater than 11.5 GHz-km at 1310 nm, and even greater than 15 GHz-km at 1310 nm.

Preferably, the fibers have numerical apertures that are less than 0.21 and the core comprises an alpha value less than 2.02 (and preferably <2.01). At least some of these fiber embodiments (see, for example, exemplary fibers 8, and 19-28) have very large overfilled bandwidths, for example greater than 20 GHz-km at 1310 nm.

Manufactured Fiber Examples 29-32

Example 29

A one meter long×26.15 mm diameter solid glass cane comprising a $GeO_2$—$SiO_2$ graded index core (approximately 0.75% maximum refractive index relative to pure silica with an approximately parabolic shape) was loaded onto a lathe. 85 grams of $SiO_2$ (0.36 g/cc density) soot were flame deposited onto the cane, and the assembly was dried for 2 hours in an atmosphere consisting of helium and 3% chlorine at 1000° C. This step was followed by down driving at 6 mm/min through a hot zone set at 1500° C. in a 100% helium atmosphere, in order to sinter the soot to an optical preform comprising a $GeO_2$—$SiO_2$ graded index core and a silica first cladding layer. The preform was then loaded onto a lathe and 547 grams of $SiO_2$ (0.36 g/cc density) soot were flame deposited and sintered as follows. The assembly was first dried for 1 hour in an atmosphere consisting of helium and 3% chlorine at 1125° C., followed by a purge in helium environment at 1125° C. for 30 minutes. The assembly was then down driven at 14 mm/min through a hot zone set at 1460° C. in an atmosphere comprising helium and 7.4% $SiF_4$ in order to sinter the soot to an overclad preform comprising a germania-silica graded index core, a silica inner cladding, and a fluorine-doped second cladding layer. The preform was drawn into a one meter×18.75 mm diameter cane, which was then placed on a lathe where 1879 grams of $SiO_2$ soot were flame deposited. The assembly was then sintered by first drying it for 2 hours in an atmosphere consisting of helium and 3% chlorine at 1000° C., followed by down driving at 6 mm/min through a hot zone set at 1500° C. in a 100% helium atmosphere. This process sintered the soot into an optical preform comprising a $GeO_2$—$SiO_2$ graded index core, a silica first cladding layer, a fluorine-doped second cladding layer and a silica outer cladding. The preform was then placed for 24 hours in an argon purged holding oven set at 1000° C. The preform was drawn to a 10 km length of 125 micron diameter fiber at 10 m/s using a draw furnace having a hot zone of about 8 cm length and set at approximately 2000° C. The measured characteristics of the fiber are set forth in Table 5.

Example 30

A one meter long×26.04 mm diameter preform comprising a $GeO_2$—$SiO_2$ graded index core (approximately 0.91% maximum refractive index relative to pure silica with an approximately parabolic shape) and a silica first cladding was loaded onto a lathe. The ratio of the diameter of the graded index core to the diameter of the glass preform was approximately 0.94. 596 grams of $SiO_2$ (0.36 g/cc density) soot were flame deposited and sintered as follows. The assembly was first dried for 1 hour in an atmosphere comprising helium and 3% chlorine at 1125° C., followed by a purge in helium environment at 1125° C. for 30 minutes. The assembly was then down driven at 14 mm/min through a hot zone set at 1460° C. in an atmosphere consisting of helium and 4.76% $SiF_4$ in order to sinter the soot to an overclad preform comprising a germania-silica graded index core, a silica inner cladding, and a fluorine-doped second cladding layer. The preform was then placed on a lathe where 3575 grams of $SiO_2$ soot were flame deposited. The assembly was then sintered by first drying it for 2 hours in an atmosphere consisting of helium and 3% chlorine at 1000° C., followed by down driving at 6 mm/min through a hot zone set at 1500° C. in a 100% helium atmosphere. This process sintered the soot into an optical preform comprising a $GeO_2$—$SiO_2$ graded index core, a silica first cladding layer, a fluorine-doped second cladding layer and a silica outer cladding. The preform was then placed for 24 hours in an argon purged holding oven set at 1000° C. The preform was drawn to a 10 km length of 125 micron diameter fiber at 10 m/s using a draw furnace having a hot zone of about 8 cm length and set at approximately 2000° C. The measured characteristics of the fiber are set forth in Table 5.

Example 31

A one meter long×17.93 mm diameter preform comprising a $GeO_2$—$SiO_2$ graded index core (approximately 0.91% maximum refractive index relative to pure silica with an approximately parabolic shape) and a silica first cladding was loaded onto a lathe designed for outside vapor deposition. The ratio of the diameter of the graded index core to the diameter of the glass preform was approximately 0.94. 172 grams of $SiO_2$ (0.36 g/cc density) soot were flame deposited and sintered as follows. The assembly was first dried for 1 hour in an atmosphere consisting of helium and 3% chlorine at 1125° C., followed by a purge in helium environment at 1125° C. for 30 minutes. The assembly was then down driven at 14 mm/min through a hot zone set at 1460° C. in an atmosphere consisting of helium and 7.4% $SiF_4$ in order to sinter the soot to an overclad preform comprising a germania-silica graded index core, a silica inner cladding, and a fluorine-doped second cladding layer. The preform was then placed on a lathe where 1255 grams of $SiO_2$ soot were flame deposited. The assembly was then sintered by first drying it for 2 hours in an atmosphere consisting of helium and 3% chlorine at 1000° C., followed by down driving at 6 mm/min through a hot zone set at 1500° C. in a 100% helium atmosphere. This process sintered the soot into an optical preform comprising a $GeO_2$—$SiO_2$ graded index core, a silica first cladding layer, a fluorine-doped second cladding layer and a silica outer cladding. The preform was then placed for 24 hours in an argon purged holding oven set at 1000° C. The preform was drawn to a 10 km length of 125 micron diameter fiber at 10 m/s using a draw furnace having a hot zone of about 8 cm length and set at approximately 2000° C. The measured characteristics of the fiber are set forth in Table 5.

Example 32

A one meter long×18.08 mm diameter preform comprising a $GeO_2$—$SiO_2$ graded index core (approximately 0.93% maximum refractive index relative to pure silica with an approximately parabolic shape) was loaded onto a lathe designed for outside vapor deposition. 1255 grams of $SiO_2$ soot were flame deposited and sintered as follows. The assembly was first dried for 2 hours in an atmosphere consisting of helium and 3% chlorine at 1000° C., followed by down driving at 6 mm/min through a hot zone set at 1500° C. in a 100% helium atmosphere. This process sintered the soot into an optical preform comprising a $GeO_2$—$SiO_2$ graded index core, and a silica outer cladding. The preform was then placed for 24 hours in an argon purged holding oven set at 1000° C. The preform was drawn to a 10 km length of 125 micron diameter fiber at 10 m/s using a draw furnace having a hot zone of about 8 cm length and set at approximately 2000° C. The measured characteristics of the fiber are set forth in Table 5.

Table 5 presents Examples 29-32 in which the multimode fiber 100 exhibits a core diameter between 45 and 65 microns, and the core has a maximum relative refractive index $\Delta_{1MAX}$ between 0.7% and 1.2%. In examples 29-31, the inner annular portion 30 comprises a width $W_2$ greater than about 0.5 and less than about 4 microns. In exemplary fiber embodiments 29, 30 and 31, $1.98 \leq \alpha \leq 2.04$. Example 32 has an alpha value greater than 2.06 and does not comprise an inner annular portion with a depressed index, and as a result, the overfilled bandwidth is less than 2500 MHz-km at 1300 nm. The overfilled bandwidth of examples 29-31 is greater than 3750 MHz-km (3.75 GHz-km) at 1300 nm, and in examples 30 and 31, is greater than 7.5 GHz-km at 1300 nm. The overfilled bandwidth of example 31 is also greater than 10 GHz-km at 1300 nm. The numerical aperture of these embodiments is between 0.16 and 0.24, and are between 0.185 and 0.215 for examples 30 and 31. The attenuation at 1310 nm is less than 0.7 dB km for Examples 29-31 and less than 0.5 dB/km for Examples 30 and 31.

TABLE 5

| Parameter | Example 29 | Example 30 | Example 31 | Example 32 |
|---|---|---|---|---|
| $\Delta_{1MAX}$ (%) | 0.75 | 0.93 | 0.91 | 0.93 |
| R1 (microns) | 23.7 | 24.4 | 29.9 | 30.0 |
| α | 1.97 | 2.01 | 2.03 | 2.072 |
| R2 (microns) | 24.29 | 25.22 | 31.14 | - |
| Δ2 (%) | 0 | 0 | 0 | 0 |
| W2 (microns) | 0.58 | 0.83 | 1.27 | 0.00 |
| R3 (microns) | 31.08 | 32.93 | 37.92 | - |
| $\Delta_{3MIN}$ (%) | -0.38 | -0.33 | -0.37 | 0 |
| W3 (microns) | 6.79 | 7.71 | 6.78 | 0.00 |
| V3 (% microns$^2$) | 113.3 | 123.5 | 140.5 | 0 |
| R4 (microns) | 62.5 | 62.5 | 62.5 | 62.5 |
| Δ4 (%) | 0 | 0 | 0 | 0 |
| Overfilled bandwidth at 1300 nm (GHz-km) | 4.16 | 16.99 | 8.01 | 2.47 |
| 2 × 10 mm bend loss at 1310 nm (dB) | 1.49 | 0.95 | 0.73 | 2.53 |
| 2 × 15 mm bend loss at 1310 nm (dB) | 0.86 | 0.38 | 0.25 | 1.01 |
| 2 × 20 mm bend loss at 1310 nm (dB) | 0.53 | 0.17 | 0.12 | 0.53 |
| Core Diameter (microns) | 45-55 | 45-55 | 62.76 | 60-65 |
| Numerical Aperture | 0.185-0.215 | 0.185-0.215 | 0.198 | 0.185-0.215 |
| Attenuation at 1310 nm (dB/km) | 0.508 | 0.471 | 0.491 | 1.615 |

Tables 6-9 summarize various modeled characteristics for the embodiments of fiber 100 in multimode fibers examples 33-53 generally in accordance with the invention disclosed herein and shown in FIG. 1. Various optical properties of the multi-mode fibers were modeled from the refractive index profile parameters. These parameters include the relative refractive index $\Delta_{1MAX}$ of the core, outer core radius $R_1$, and the graded index alpha (α) parameter. Additionally, the parameters include the relative refractive index $\Delta_2$ of the inner annular portion 40, the radius $R_2$ of the inner annular portion 40, and the width $W_2$ of the inner annular portion 40. Further, the parameters include the minimum relative refractive index $\Delta_{3MIN}$ of the depressed-index annular portion 50, and the outer radius $R_3$ of the depressed-index annular portion 50. Further calculations include the overfilled bandwidth at 1510 nm, 1520 nm, 1530 nm, 1540 nm, 1550 nm, 1560 nm, 1570 nm, 1580 nm and 1590 nm, the dispersion and dispersion slope at 1550 nm, the attenuation at 1550 nm, the core diameter in microns, and the numerical aperture. In the examples of Tables 6-9 the fiber has a high overfilled bandwidth (BW) in the 1550 nm window due (a) to the core having an (Δ) value between 1.95 and 2.04, and (b) the optimized width $W_2$ of the inner annular portion 40. The optimum width for each embodiment depends on the maximum relative refractive indices of the core, the inner annular portion and the depressed index annular portion. These refractive index profiles enable an overfilled bandwidth greater than 2500 MHz-km at 1550 nm, and in some preferred embodiments, the overfilled bandwidth at 1310 nm is greater than 3750, 5000 or even 7500 MHz-km. In some embodiments, the overfilled bandwidth is greater than 2500 MHz-km at all wavelengths in the range from 1530 to 1580 nm, and in preferred embodiments, is greater than 3750, 5000 or even 7500 MHz-km at all wavelengths in the range from 1530 to 1580 nm. In other embodiments, the overfilled bandwidth is greater than 2500 MHz-km at all wavelengths in the range from 1520 to 1590 nm, and in preferred embodiments, is greater than 3750, 5000 or even 7500 MHz-km at all wavelengths in the range from 1520 to 1590 nm. In other embodiments, the overfilled bandwidth is greater than 2500 MHz-km at all wavelengths in the range from 1510 to 1590 nm, and in preferred embodiments, is greater than 3750, 5000 or even 7500 MHz-km at all wavelengths in the range from 1510 to 1590 nm. In some embodiments, the overfilled bandwidth is greater than 2500 MHz-km at all wavelengths in the range from 1500 to 1600 nm, and in preferred embodiments, is greater than 3750, 5000 or even 7500 MHz-km at all wavelengths in the range from 1500 to 1600 nm. Preferably, the overfilled bandwidth is greater than 2500 MHz-km at all wavelengths in the range from 1500 nm to 1700 nm.

TABLE 6

| | Example 33 | Example 34 | Example 35 | Example 36 | Example 37 |
|---|---|---|---|---|---|
| Δ1 (%) | 0.984 | 0.984 | 0.984 | 0.984 | 0.984 |
| R1 (μm) | 24.8 | 24.8 | 24.5 | 24 | 24 |
| α | 1.979 | 1.980 | 1.981 | 1.982 | 1.982 |
| R2 (μm) | 25.62 | 25.45 | 25.6 | 25.15 | 25.22 |
| Δ2 (%) | 0 | 0 | 0 | 0 | 0 |
| W2 (μm) | 0.82 | 0.65 | 1.10 | 1.15 | 1.22 |
| R3 (μm) | 31 | 33 | 31 | 30 | 30 |
| Δ3 (%) | -0.32 | -0.26 | -0.45 | -0.54 | -0.63 |
| W3 (μm) | 5.38 | 7.55 | 5.40 | 4.85 | 4.78 |
| V3 (%-sq. μm) | -87 | -107 | -121 | -124 | -142 |
| R4 (μm) | 62.5 | 62.5 | 62.5 | 62.5 | 62.5 |
| Δ4 (%) | 0 | 0 | 0 | 0 | 0 |
| BW1510 (Ghz-km) | 10.3 | 12.5 | 10.9 | 11.4 | 8.5 |
| BW1520 (Ghz-km) | 12.3 | 14.7 | 13.2 | 10.1 | 7.0 |
| BW1530 (Ghz-km) | 14.6 | 16.9 | 15.4 | 8.2 | 5.7 |
| BW1540 (Ghz-km) | 16.7 | 17.9 | 15.8 | 20.5 | 20.7 |
| BW1550 (Ghz-km) | 17.7 | 17.7 | 15.8 | 20.3 | 20.5 |
| BW1560 (Ghz-km) | 16.0 | 14.8 | 11.0 | 17.1 | 15.0 |
| BW1570 (Ghz-km) | 13.6 | 12.6 | 8.7 | 13.8 | 11.9 |
| BW1580 (Ghz-km) | 11.3 | 10.6 | 14.5 | 11.1 | 9.5 |
| BW1590 (Ghz-km) | 9.4 | 9.1 | 12.1 | 9.1 | 7.8 |
| Dispersion at 1550 nm (ps/nm/km) | 19.8 | 19.8 | 19.8 | 19.8 | 19.8 |
| Dispersion Slope at 1550 nm (ps/nm2/km) | 0.07 | 0.07 | 0.07 | 0.07 | 0.07 |
| Attenuation at 1550 nm (dB/km) | 0.18 | 0.18 | 0.18 | 0.18 | 0.18 |
| Core Diameter (μm) | 49.6 | 49.6 | 49 | 48 | 48 |
| Numerical Aperture | 0.205 | 0.205 | 0.205 | 0.205 | 0.205 |

TABLE 7

|  | Example 38 | Example 39 | Example 40 | Example 41 | Example 42 | Example 43 |
|---|---|---|---|---|---|---|
| Δ1 (%) | 0.74 | 0.84 | 0.93 | 1.10 | 1.27 | 1.45 |
| R1 (μm) | 24.8 | 24.8 | 24.8 | 24.8 | 24.8 | 24.8 |
| α | 1.981 | 1.981 | 1.980 | 1.978 | 1.978 | 1.978 |
| R2 (μm) | 25.82 | 25.75 | 25.66 | 25.52 | 25.44 | 25.36 |
| Δ2 (%) | 0 | 0 | 0 | 0 | 0 | 0 |
| W2 (μm) | 1.02 | 0.95 | 0.86 | 0.72 | 0.64 | 0.56 |
| R3 (μm) | 31 | 31 | 31 | 31 | 31 | 31 |
| Δ3 (%) | −0.32 | −0.32 | −0.32 | −0.32 | −0.32 | −0.32 |
| W3 (μm) | 5.18 | 5.25 | 5.34 | 5.48 | 5.56 | 5.64 |
| V3 (%-sq. μm) | −83 | −84 | −86 | −89 | −91 | −93 |
| R4 (μm) | 62.5 | 62.5 | 62.5 | 62.5 | 62.5 | 62.5 |
| Δ4 (%) | 0 | 0 | 0 | 0 | 0 | 0 |
| BW1510 (Ghz-km) | 11.3 | 13.1 | 13.8 | 9.9 | 7.3 | 7.7 |
| BW1520 (Ghz-km) | 10.5 | 15.9 | 15.2 | 11.3 | 10.1 | 7.5 |
| BW1530 (Ghz-km) | 21.6 | 19.6 | 15.2 | 12.4 | 10.7 | 7.1 |
| BW1540 (Ghz-km) | 25.7 | 23.4 | 13.7 | 14.6 | 10.6 | 6.6 |
| BW1550 (Ghz-km) | 27.3 | 24.7 | 23.7 | 15.5 | 10.0 | 6.0 |
| BW1560 (Ghz-km) | 24.4 | 21.8 | 21.9 | 14.9 | 9.0 | 5.4 |
| BW1570 (Ghz-km) | 19.8 | 17.6 | 18.3 | 13.2 | 8.0 | 4.8 |
| BW1580 (Ghz-km) | 15.8 | 14.0 | 14.8 | 11.3 | 7.0 | 4.4 |
| BW1590 (Ghz-km) | 12.8 | 11.4 | 12.1 | 9.5 | 6.2 | 4.0 |
| Dispersion at 1550 nm (ps/nm/km) | 20.4 | 20.2 | 19.9 | 19.5 | 19.1 | 18.7 |
| Dispersion Slope at 1550 nm (ps/nm2/km) | 0.07 | 0.07 | 0.07 | 0.07 | 0.07 | 0.07 |
| Attenuation at 1550 nm (dB/km) | 0.18 | 0.18 | 0.18 | 0.18 | 0.18 | 0.18 |
| Core Diameter (μm) | 49.6 | 49.6 | 49.6 | 49.6 | 49.6 | 49.6 |
| Numerical Aperture | 0.177 | 0.189 | 0.199 | 0.217 | 0.233 | 0.250 |

TABLE 8

|  | Example 44 | Example 45 | Example 46 | Example 47 | Example 48 | Example 49 |
|---|---|---|---|---|---|---|
| Δ1 (%) | 1.52 | 1.45 | 1.27 | 1.13 | 0.98 | 0.89 |
| R1 (μm) | 38 | 32.5 | 32.5 | 32.5 | 32 | 32 |
| α | 1.977 | 1.975 | 1.978 | 1.977 | 1.978 | 1.980 |
| R2 (μm) | 39.07 | 33.47 | 33.75 | 33.43 | 33.07 | 33.11 |
| Δ2 (%) | 0 | 0 | 0 | 0 | 0 | 0 |
| W2 (μm) | 1.07 | 0.97 | 1.25 | 0.93 | 1.07 | 1.11 |
| R3 (μm) | 43 | 39 | 40 | 37 | 40 | 38 |
| Δ3 (%) | −0.45 | −0.45 | −0.5 | −0.35 | −0.3 | −0.3 |
| W3 (μm) | 3.93 | 5.53 | 6.25 | 3.57 | 6.93 | 4.89 |
| V3 (%-sq. μm) | −120 | −160 | −206 | −72 | −139 | −90 |
| R4 (μm) | 62.5 | 62.5 | 62.5 | 62.5 | 62.5 | 62.5 |
| Δ4 (%) | 0 | 0 | 0 | 0 | 0 | 0 |
| BW1510 (Ghz-km) | 6.2 | 6.7 | 6.7 | 9.4 | 8.1 | 10.9 |
| BW1520 (Ghz-km) | 5.8 | 7.3 | 7.4 | 10.8 | 9.3 | 12.9 |
| BW1530 (Ghz-km) | 6.2 | 7.5 | 7.9 | 12.1 | 10.9 | 15.5 |
| BW1540 (Ghz-km) | 5.6 | 7.1 | 8.3 | 12.7 | 12.8 | 18.7 |
| BW1550 (Ghz-km) | 5.0 | 6.4 | 8.4 | 12.2 | 14.8 | 21.1 |
| BW1560 (Ghz-km) | 4.5 | 5.5 | 7.9 | 11.1 | 15.9 | 20.9 |
| BW1570 (Ghz-km) | 4.0 | 4.7 | 7.1 | 9.7 | 15.2 | 18.0 |
| BW1580 (Ghz-km) | 3.6 | 4.0 | 6.2 | 8.4 | 18.2 | 14.7 |
| BW1590 (Ghz-km) | 3.2 | 5.5 | 6.9 | 7.4 | 16.1 | 11.9 |
| Dispersion at 1550 nm (ps/nm/km) | 18.4 | 18.6 | 19.1 | 19.4 | 19.8 | 20.00 |
| Dispersion Slope at 1550 nm (ps/nm2/km) | 0.07 | 0.07 | 0.07 | 0.07 | 0.07 | 0.07 |
| Attenuation at 1550 nm (dB/km) | 0.18 | 0.18 | 0.18 | 0.18 | 0.18 | 0.18 |
| Core Diameter (μm) | 76 | 65 | 65 | 65 | 64 | 64 |
| Numerical Aperture | 0.256 | 0.250 | 0.233 | 0.220 | 0.204 | 0.194 |

TABLE 9

|  | Example 50 | Example 51 | Example 52 | Example 53 |
|---|---|---|---|---|
| Δ1 (%) | 0.99 | 0.89 | 0.74 | 0.64 |
| R1 (μm) | 21 | 21 | 21 | 21 |
| α | 1.980 | 1.980 | 1.982 | 1.982 |
| R2 (μm) | 21.84 | 21.95 | 22.09 | 22.16 |
| Δ2 (%) | 0 | 0 | 0 | 0 |
| W2 (μm) | 0.84 | 0.95 | 1.09 | 1.16 |
| R3 (μm) | 27 | 27 | 27 | 27 |
| Δ3 (%) | −0.4 | −0.4 | −0.4 | −0.4 |

TABLE 9-continued

| | Example 50 | Example 51 | Example 52 | Example 53 |
|---|---|---|---|---|
| W3 (μm) | 5.16 | 5.05 | 4.91 | 4.84 |
| V3 (%-sq. μm) | −90 | −87 | −84 | −82 |
| R4 (μm) | 62.5 | 62.5 | 62.5 | 62.5 |
| Δ4 (%) | 0 | 0 | 0 | 0 |
| BW1510 (Ghz-km) | 9.5 | 8.8 | 13.0 | 12.7 |
| BW1520 (Ghz-km) | 11.2 | 10.4 | 15.6 | 11.7 |
| BW1530 (Ghz-km) | 13.4 | 12.5 | 19.4 | 10.4 |
| BW1540 (Ghz-km) | 16.4 | 15.4 | 24.8 | 9.0 |
| BW1550 (Ghz-km) | 19.5 | 19.0 | 31.1 | 37.7 |
| BW1560 (Ghz-km) | 20.9 | 21.7 | 32.6 | 46.1 |
| BW1570 (Ghz-km) | 19.0 | 20.7 | 26.9 | 42.0 |
| BW1580 (Ghz-km) | 15.6 | 16.9 | 20.4 | 31.3 |
| BW1590 (Ghz-km) | 12.6 | 13.3 | 15.7 | 23.1 |
| Dispersion at 1550 nm (ps/nm/km) | 19.8 | 20.1 | 20.4 | 20.6 |
| Dispersion Slope at 1550 nm (ps/nm2/km) | 0.07 | 0.07 | 0.07 | 0.07 |
| Attenuation at 1550 nm (dB/km) | 0.18 | 0.18 | 0.18 | 0.18 |
| Core Diameter (μm) | 42 | 42 | 42 | 42 |
| Numerical Aperture | 0.205 | 0.194 | 0.177 | 0.164 |

Figure 3:
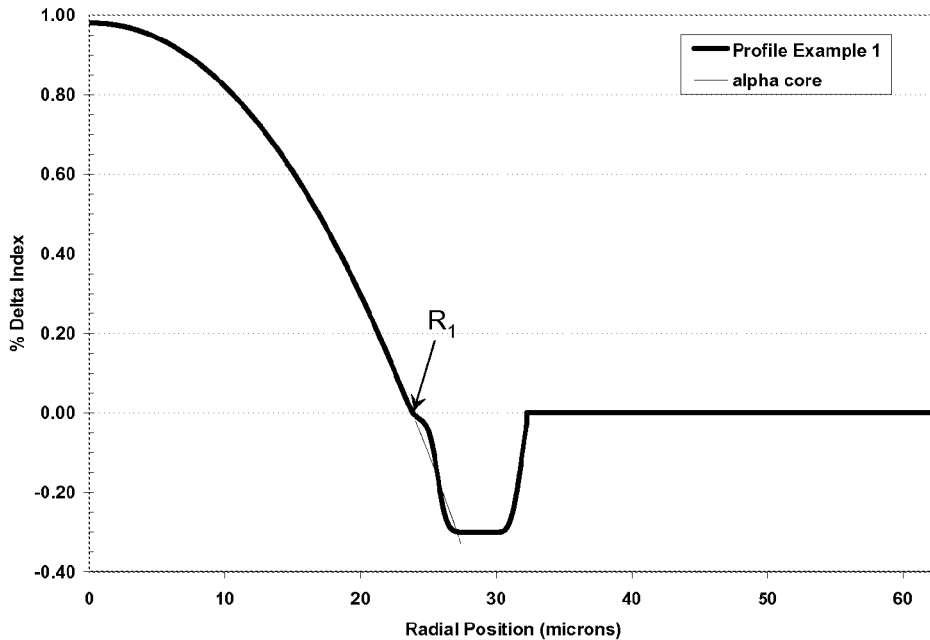
FIG. 3 is a graph illustrating the refractive index profile of an exemplary embodiment of the multimode optical fiber.
Figure 3A:
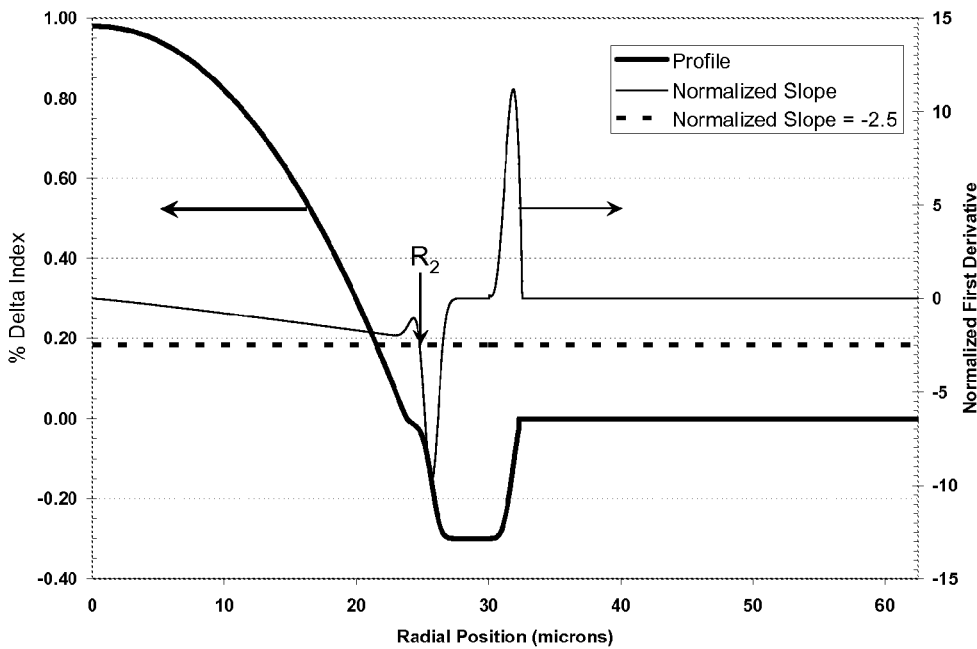
FIG. 3A is a graph illustrating the refractive index profile of another exemplary embodiment of the multimode optical fiber.

FIG. 3 illustrates a refractive index profile with the inner annular portion 30 of a fiber having an index profile as described above with respect to FIG. 1. The example illustrated in FIG. 3 is a multimode fiber configured according to Example 1 provided in Table 1 and comprises a graded index core and a cladding surrounding the core, wherein the cladding comprises an inner annular portion, a depressed annular portion surrounding the inner annular portion, and an outer annular portion surrounding the depressed annular portion. The core has an outer radius $R_1$ of 24.8 microns and the inner annular portion comprises a width of 0.86 microns. The glass core and the inner cladding have alpha values that are different. FIG. 3A illustrates a refractive index profile and a derivative of the normalized refractive index profile.

Figure 4:
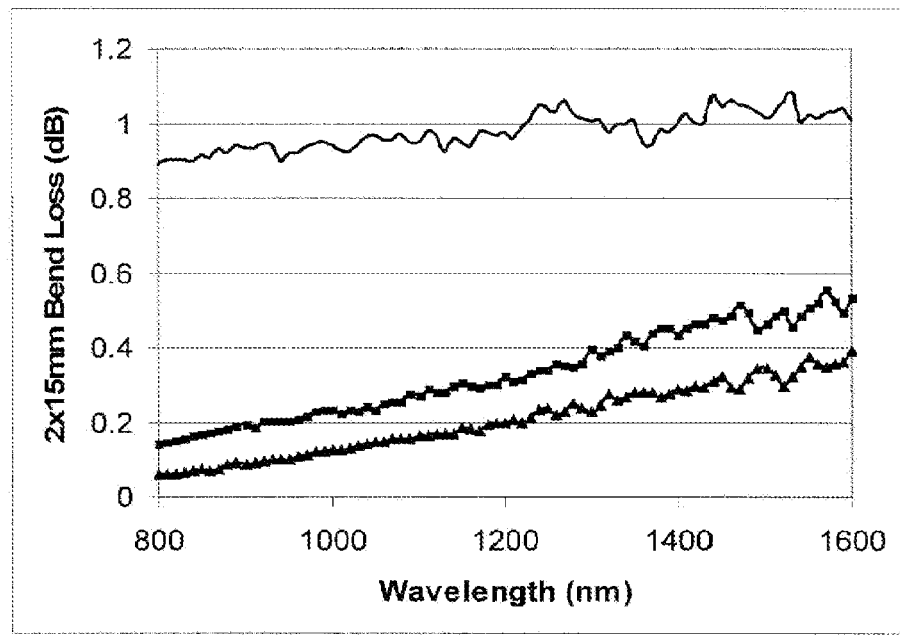
FIG. 4 is a graph illustrating the macrobend loss as a function of wavelength of three exemplary embodiments of the multimode optical fiber.

FIG. 4 illustrates the measured bend loss for examples 30-32 for two turns around a mandrel having a diameter of 15 mm. Examples 30 (squares) and 31 (triangles) comprise an inner annular segment with a depressed index and have 2×15 mm bend losses less than 0.5 dB at 1310 nm. The 2×15 mm bend loss also less than 0.5 dB at all wavelengths between 1260 and 1400 nm. Example 32 (solid line) does not comprise an inner annular segment with a depressed index and has a 2×15 mm bend loss greater than about 0.7 dB at 1310 nm and at all wavelengths between 1260 and 1400 nm.

Figure 5:
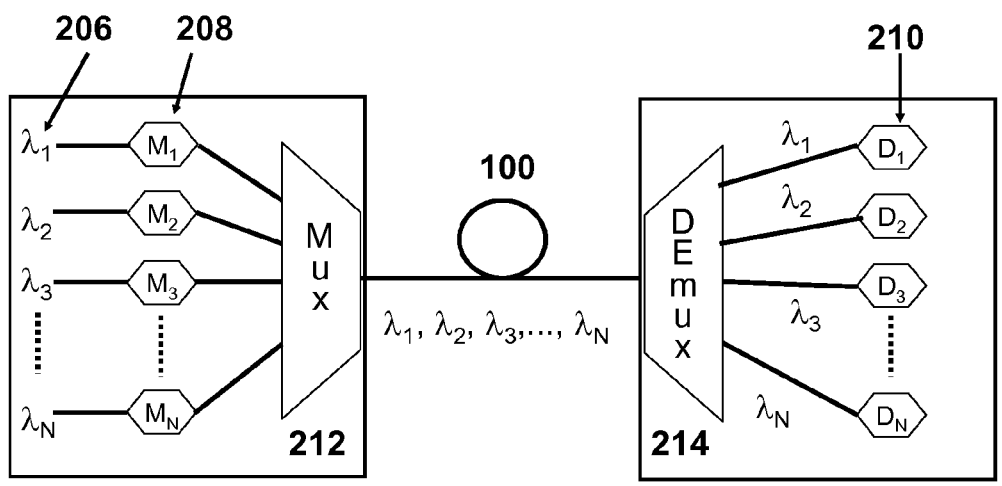
FIG. 5 is a schematic illustration of a transmission system utilizing one embodiment of the multimode optical fiber.

FIG. 5 illustrates one embodiment of the optical transmission system that utilizes multimode fiber 100. According to some embodiments the multi-mode optical fiber 100 is coupled to at least one light source 204 operating between 1200 nm and 1700 nm (e.g., 1260 nm to 1400 nm or 1490 to 1610 nm) and modulated at a bit rate greater than 20 GHz (e.g., 25 GHz). Fiber 100 is a multimode optical fiber optically and comprises a graded index a graded index glass core of 41 to 80 nm in diameter, and a cladding comprising an outer cladding portion, wherein the fiber has an overfilled bandwidth greater than 2.5 GHz-km at a wavelength of 1310 nm or 1550 nm; an alpha less than about 2.04 (and preferably less than 2.03); a dispersion magnitude less than 5 ps/nm/km; and an attenuation less than 0.7 dB/km at the operating wavelength (e.g., 1310 nm, or 1550 nm). A receiver or photodetector 210 is optically coupled to the multimode optical fiber 100 and is structured to be capable of detecting a wavelength in a wavelength greater than 1200 nm, for example between 1200 nm and 1700 nm (e.g., 1260 nm to 1400 nm, or 1490 to 1610 nm.

According to some embodiments the optical fiber 100 is coupled to a VCSEL, and the VCSEL is modulated at a rate greater than 20 GHz. According to some embodiments the optical fiber 100 is coupled to a silicon-photonics optical source operating in the 1200 nm to 1400 nm range or in the 1260 to 1400 nm range (e.g., 1260 to 1360 nm, 1260 nm, 1290 nm, 1310 nm, 1330 nm, 1350 nm, 1370 nm, or 1400 nm). Thus, exemplary fibers 1-28 of Tables 1 through 9 are suitable for use in an optical transmission system. According to one embodiment, the system 200 comprises: (i) a transceiver comprising at least one light source 206 (e.g., VCSEL or silicon-photonics laser), wherein the light source is modulated at a bit rate of 25 GHz or higher (and preferably, according to some embodiments, at 40 GHz or higher) at one or more wavelengths between 1200 and 1400 nm (e.g., between 1260 and 1400 nm, or between 1260 and 1360 nm, or between 1270 and 1350 nm, or between 1280 and 1340 nm); (ii) at least one multimode optical fiber 100; and (iii) a receiver comprising at least one photodetector 210. In one embodiment, the transceiver comprises N light sources modulated at a bit rate of 25 GHz or higher, as shown in FIG. 5. The transceiver may also comprise at least one external modulator 208 which modulates the at least one light source at a bit rate of 25 GHz or higher. The transceiver may further comprise a multiplexer (Mux) 212 which multiplexes the N wavelengths from N light sources into a single waveguide. The receiver may further comprise a demultiplexer (Demux) 212 which demultiplexes the optical signal into N wavelengths and optically couples them to N photodetectors 210. The photodetector 210 is optically coupled to the multimode optical fiber 100 and capable of detecting a wavelength in the 1200 to 1700 nm wavelength range.

According to some embodiments the optical fiber 100 comprises a graded index glass core, an inner cladding region surrounding the core and an outer cladding, and has an overfilled bandwidth at an operating wavelength situated in the 1260 and 1400 nm wavelength range greater than 5 GHz-km; an alpha less than about 2.04 and preferably less than 2.02; a dispersion magnitude less than 10 ps/nm/km and attenuation less than 0.7 dB/km at the operating wavelength. According to other embodiments the optical fiber 100 comprises a graded index glass core, an inner cladding region surrounding the core and an outer cladding, and has an overfilled bandwidth at an operating wavelength situated in the 1490 to 1610 nm wavelength range greater than 5 GHz-km; an alpha less than about 2.04 and preferably less than 2.02; a dispersion magnitude less than 10 ps/nm/km and attenuation less than 0.7 dB/km at the operating wavelength. In some embodiments, for example, the light source 206 (e.g., VCSEL or silicon-photonics laser) is modulated at a bit rate of at least 30 GHz, in some embodiments at least 35 GHz or 37 GHz, in some embodiments at least 40 GHz and in some embodiments at least 45 GHz. Some embodiments of fiber have an overfilled bandwidth greater than 4.7 GHz-km at one or more wavelengths between 1260 and 1360 nm, and some embodiments of fiber have an overfilled bandwidth greater than 4.7 GHz-km at all wavelengths between 1290 and 1330 nm; and some embodiments of fiber have an overfilled bandwidth greater than 4.7 GHz-km at all wavelengths between 1270 and 1350 nm.

It is noted that light sources other than VCSELS may also be utilized, for example, hybrid silicon lasers (e.g. silicon-photonic lasers) operating at wavelengths between 1200 and 1700, for example between 1200 nm and 1400 nm, or 1260 nm and 1400 nm (e.g., between 1260 nm and 1360 nm); or between 1490 and 1700 nm, for example 1490 to 1610 nm. Hybrid silicon lasers are made, for example, by bonding an Indium Phosphide based wafer directly to a pre-patterned silicon photonic chip. This technology is described, for example, in the publication by A. W. Fang et al., "Electrically pumped hybrid AlGaInAs-silicon evanescent laser," Optics Express vol. 14, pp. 9203-9210 (October 2006). When a voltage is applied to the bonded chip, the light generated from the Indium Phosphide based material couples directly into the silicon waveguide, creating a hybrid silicon laser 206. One of the main advantages of this technology is the ability to incorporate many lasers onto a single chip, and the outputs from these lasers can be multiplexed into a single output that is then coupled to a multimode fiber 100. For example, two, four, eight or sixteen wavelengths in the 1250-1370 nm range may be modulated at a bit rate of 25 GHz or higher, multiplexed into a single output channel, and then optically coupled to the input end of multimode fiber 100. The output end of multimode fiber 100 is optically coupled to a receiver which demultiplexes the two, four, eight or sixteen wavelengths in the 1200 to 1700 nm range (e.g., 1250-1370 nm range, or 1490 to 1610 nm) and optically couples them to photodetectors capable of detecting the optical signals.

One embodiment of such system comprises, for example: (i) at least one VCSEL 206, the VCSEL transmitting at a bit rate of 25 GHz or higher (and preferably, according to some embodiments) at 40 GHz or higher at one or more wavelengths between 1260 and 1360 nm; (ii) a multimode optical fiber 100; and (iii) at least one photodetector 210. The multimode fiber 100 for example, comprises a graded index glass core 20; an inner cladding portion 30 surrounding and in contact with the core, and a depressed-index annular cladding portion 40 surrounding the inner cladding portion. 30, the depressed-index annular portion 40 having a relative refractive index delta less than about −0.2% and a width of at least 1 micron, wherein the core 20 has a radius greater than 20.5 microns and less than 40 microns, a maximum relative refractive index between 0.6% and 1.6% (preferably between 0.8% and 1.3%), and an alpha less than about 2.04 (preferably less than 2.03). The multimode fiber 100 has, at one or more wavelengths between 1260 nm and 1360 nm or between 1500 and 1600 nm, an overfilled bandwidth greater than 4.7 GHz-km, a dispersion magnitude less than 10 ps/nm/km and an attenuation less than 0.7 dB/km.

The above described system embodiment has one or more of the following advantages: energy efficiency and bit rate. Electrical power consumption is a serious problem in modern data centers, and longer systems that utilized longer wavelength (≥1200 nm) light sources such as VCSELs (≥1200 nm, or ≥1260 nm, or other sources) in conjunction with the multimode optical fiber 100 would mitigate some of energy consumption problems faced by the transmission systems operating at 850 nm. In addition, there appear to be significant hurdles to increasing the speed of the systems above 35 GHz-km if the of operation wavelength of the transmission system is about 850 nm. Utilizing longer wavelength light sources (e.g., ≥1300 nm), for example VCSELs based on In—Ga—As semiconductors, in conjunction with the multimode optical fiber 100 enables a transmission system with significantly higher transmission speeds (for example, ≥20 GHz, or ≥25 GHz, or ≥35 GHz, or even ≥40 GHz) than what is currently available.

It will be apparent to those skilled in the art that various modifications and variations can be made without departing from the spirit or scope of the claims.

What is claimed is:

1. A multimode optical fiber comprising:
   a graded index glass core having a diameter in the range of 41 microns to 80 microns, a graded index having an alpha profile wherein 1.9≤a≤2.04 and a maximum relative refractive index $\Delta_{1MAX}$ in the range between 0.6% and 1.6%; and
   a cladding surrounding and in contact with the core, said cladding comprising an inner annular portion surrounding and in contact with the core with relative refractive index delta $\Delta_2$, measured at the outer radius $R_2$, and R2 is the smallest radius where the first derivative $d(\Delta/\Delta_{1MAX})/d(r/R_1)$, is equal to −2.5; and a depressed-index annular portion surrounding the inner annular portion,
   wherein the fiber has an overfilled bandwidth greater than 2500 MHz-km at at least one wavelength between 1260 nm and 1610 nm.

2. The optical fiber of claim 1, wherein
   (i) the fiber core has a numerical aperture NA, and 0.16<NA≤0.226; (ii) the cladding comprises an outer annular portion surrounding and in contact with the depressed-index annular portion; and (iii) the fiber has an overfilled bandwidth greater than 3750 MHz-km at 1310 nm.

3. The optical fiber of claim 1, wherein
   (i) the fiber core has a numerical aperture NA, and 0.16<NA≤0.226; (ii) the cladding comprises an outer annular portion surrounding and in contact with the depressed-index annular portion; and (iii) the fiber has an overfilled bandwidth greater than 3750 MHz-km at 1550 nm.

4. The optical fiber of claim 1, wherein the depressed-index annular portion has a minimum relative refractive index $\Delta_{3MIN}$ less than −0.2% and a width of at least 1 micron.

5. The optical fiber of claim 3, wherein the depressed-index annular portion has a relative minimum refractive index $\Delta_{3MIN}$ between −0.25% and −0.7%.

6. The optical fiber of claim 1, wherein the core has a maximum relative refractive index $\Delta_{1MAX}$ between 0.7% and 1.2%.

7. The optical fiber of claim 1, wherein the numerical aperture of the core is the range 0.17≤NA≤0.215.

8. The optical fiber of claim 1, wherein the fiber has an overfilled bandwidth greater than 2500 MHz-km for all wavelengths between: (i) 1260 nm and 1360 nm; or (ii) 1520 to 1580 nm.

9. The optical fiber of claim 1, wherein the fiber has an overfilled bandwidth greater than 3750 MHz-km for all wavelengths between: (i) 1270 nm and 1350 nm, or (ii) 1530 nm and 1570 nm.

10. The optical fiber of claim 1, wherein the fiber has an overfilled bandwidth greater than 5000 MHz-km at either 1310 nm or 1550 nm.

11. The optical fiber of claim 1, wherein the fiber has an overfilled bandwidth greater than 7500 MHz-km at 1310 nm.

12. The optical fiber of claim 11, wherein the fiber has an overfilled bandwidth greater than 5000 MHz-km for all wavelengths between 1270 nm and 1350 nm.

13. The optical fiber of claim 1, wherein the fiber has an overfilled bandwidth greater than 7500 MHz-km at 1550 nm.

14. The optical fiber of claim 13, wherein the fiber has an overfilled bandwidth greater than 5000 MHz-km for all wavelengths between 1520 nm and 1580 nm.

15. The optical fiber of claim 1, wherein the core has an alpha less than 2.02.

16. A system comprising:
(i) at least one light source transmitting at a bit rate of 25 GHz or higher at one or more operating wavelengths between 1200 and 1700 nm;
(ii) at least one multimode optical fiber optically coupled to said light source, said fiber comprises a graded index glass core of 41 to 80 microns in diameter, and a cladding comprising an outer cladding portion, wherein said fiber has an overfilled bandwidth greater than 2.5 GHz-km at at least one wavelength between 1200 nm and 1700 nm; an alpha less than about 2.04; and a dispersion magnitude less than 10 ps/nm/km and an attenuation less than 0.7 dB/km at said one or more operating wavelengths; and
(iii) a detector optically coupled to said multimode optical fiber and capable of detecting a wavelength in between 1200 nm to 1700 nm.

17. A system according to claim 16, wherein said core has a radius greater than 20.5 microns and less than 40 microns, a maximum relative refractive index $\Delta_{1MAX}$ between 0.6% and 1.6%, and said fiber has an overfilled bandwidth greater than 5.0 GHz-km at one or more wavelengths between: (i) 1200 nm and 1400 nm; or (ii) 1500 and 1600 nm.

18. A system according to claim 16, wherein said cladding comprises: an inner annular portion surrounding and in contact with the core with relative refractive index delta $\Delta_2$, measured at the outer radius $R_2$ and R2 is the smallest radius where the first derivative $d(\Delta/\Delta_{1MAX})/d(r/R_1)$, is equal to −2.5; and a depressed-index annular portion surrounding the inner cladding portion, said depressed-index annular portion having a relative refractive index delta $\Delta_{3MIN}$ less than about −0.2% and a width of at least 1 micron, and said fiber has, an overfilled bandwidth greater than 5.0 GHz-km at one or more wavelengths between either 1200 nm and 1400 nm, or 1500 nm and 1600 nm.

19. A system according to claim 16, wherein said at least one light source is at least one VCSEL.

20. A system according to claim 16, wherein said at least one light source is at least one silicon-photonics laser.

21. The multimode optical fiber of claim 1, wherein the fiber has an overfilled bandwidth greater than 2500 MHz-km at the at least one wavelength between 1500 nm and 1600 nm.

22. The multimode optical fiber of claim 1, wherein the fiber has an overfilled bandwidth greater than 2500 MHz-km at the at least one wavelength between 1200 nm and 1400 nm.

23. The multimode optical fiber of claim 1, wherein the core has the maximum relative refractive index $\Delta_{1MAX}$ in the range between 0.8% and 1.3%.

* * * * *